(12) United States Patent
Haley, III

(10) Patent No.: US 6,875,344 B2
(45) Date of Patent: Apr. 5, 2005

(54) WASTEWATER TRICKLE TOWER SPRAYING ARRANGEMENT

(75) Inventor: John W. Haley, III, Providence, RI (US)

(73) Assignee: Bioprocess Technologies Ltd., Portsmouth, RI (US)

(*) Notice: Subject to any disclaimer, the term of this patent is extended or adjusted under 35 U.S.C. 154(b) by 92 days.

(21) Appl. No.: 10/375,276

(22) Filed: Feb. 27, 2003

(65) Prior Publication Data

US 2003/0196953 A1 Oct. 23, 2003

Related U.S. Application Data

(60) Provisional application No. 60/362,602, filed on Mar. 8, 2002.

(51) Int. Cl.$^7$ .................................................. C02F 3/04
(52) U.S. Cl. ........................ 210/150; 210/615; 210/541
(58) Field of Search ................................ 210/150, 151, 210/541, 542, 615, 617

(56) References Cited

U.S. PATENT DOCUMENTS

| | | | | |
|---|---|---|---|---|
| 681,884 A | * | 9/1901 | Monjeau | 210/617 |
| 968,015 A | * | 8/1910 | Wilkie | 210/151 |
| 2,008,507 A | | 7/1935 | Laughlin | |
| 2,141,979 A | * | 12/1938 | Orin et al. | 210/151 |
| 2,220,859 A | * | 11/1940 | Bispham et al. | 210/150 |
| 2,308,866 A | | 1/1943 | Dekema | |
| 3,238,124 A | | 3/1966 | Burton | |
| 3,275,147 A | | 9/1966 | Gilde | |
| 3,407,935 A | * | 10/1968 | Burton | 210/151 |
| 3,876,542 A | * | 4/1975 | Carlson | 210/150 |
| 4,011,162 A | * | 3/1977 | Oldham et al. | 210/151 |
| 4,422,930 A | | 12/1983 | Hatanaka | |
| 4,451,362 A | | 5/1984 | Spelsberg | |
| 4,717,519 A | | 1/1988 | Sagami | |
| 4,729,828 A | | 3/1988 | Miller | |
| 5,085,766 A | | 2/1992 | Born | |
| 5,232,676 A | * | 8/1993 | Wolff et al. | 210/615 |
| 5,397,474 A | | 3/1995 | Henry | |
| 5,622,630 A | | 4/1997 | Romano | |
| 5,976,377 A | | 11/1999 | Hyfantis, Jr. et al. | |
| 6,241,889 B1 | | 6/2001 | Haley, III | |
| 6,406,630 B1 | * | 6/2002 | Henry | 210/150 |

* cited by examiner

Primary Examiner—Christopher Upton
(74) Attorney, Agent, or Firm—Wildman, Harrold, Allen & Dixon LLP

(57) ABSTRACT

A trickle tower for treating wastewater has a support structure containing biomedia, preferably strands of looped cord biomedia. A spray arrangement for spraying wastewater onto the biomedia has the combination of at least one rotatable device with nozzle openings movable along circular paths as the device rotates, and stationary nozzles. A continuous flow of wastewater is supplied to the rotatable device, and intermittent pulses of wastewater are supplied to the stationary nozzles. By strategically locating the stationary nozzles, different shaped cross-sectional areas of biomedia can be adequately sprayed. In place of the rotatable device can be an oscillating manifold extending across the biomedia and having a slot nozzle for cascading wastewater downwardly onto the biomedia with or without the stationary nozzles. A base receptacle below the biomedia receives wastewater falling from the biomedia. The biomedia is surrounded by a flexible curtain suspended from the support structure and extending down to the receptacle, enabling different shaped cross-sectional areas of biomedia to be accommodated. The curtain may have a vertically-extending, releasably-closeable opening.

9 Claims, 17 Drawing Sheets

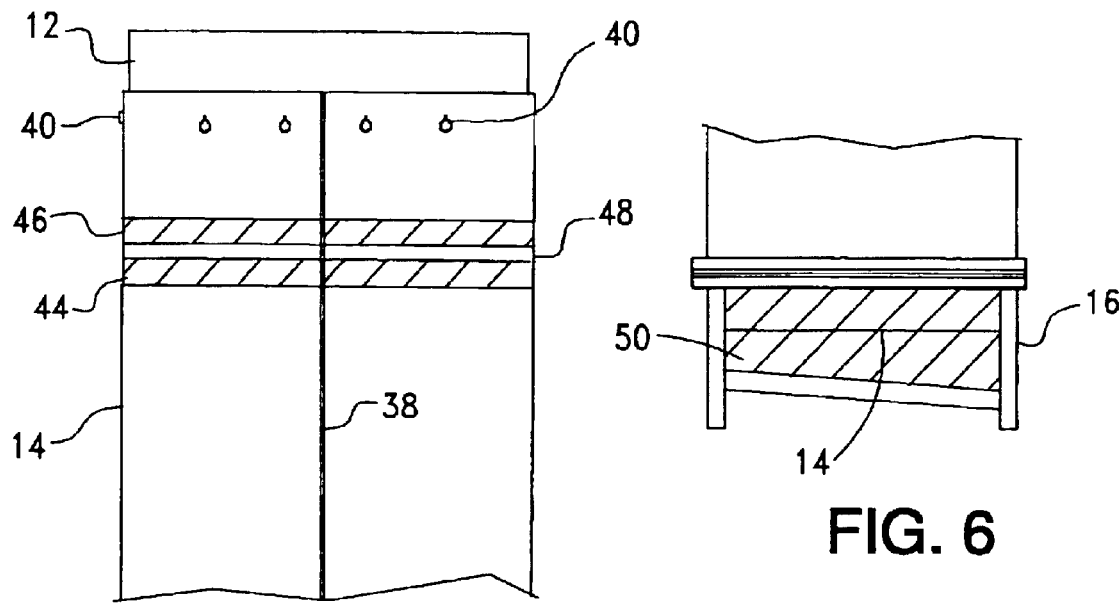
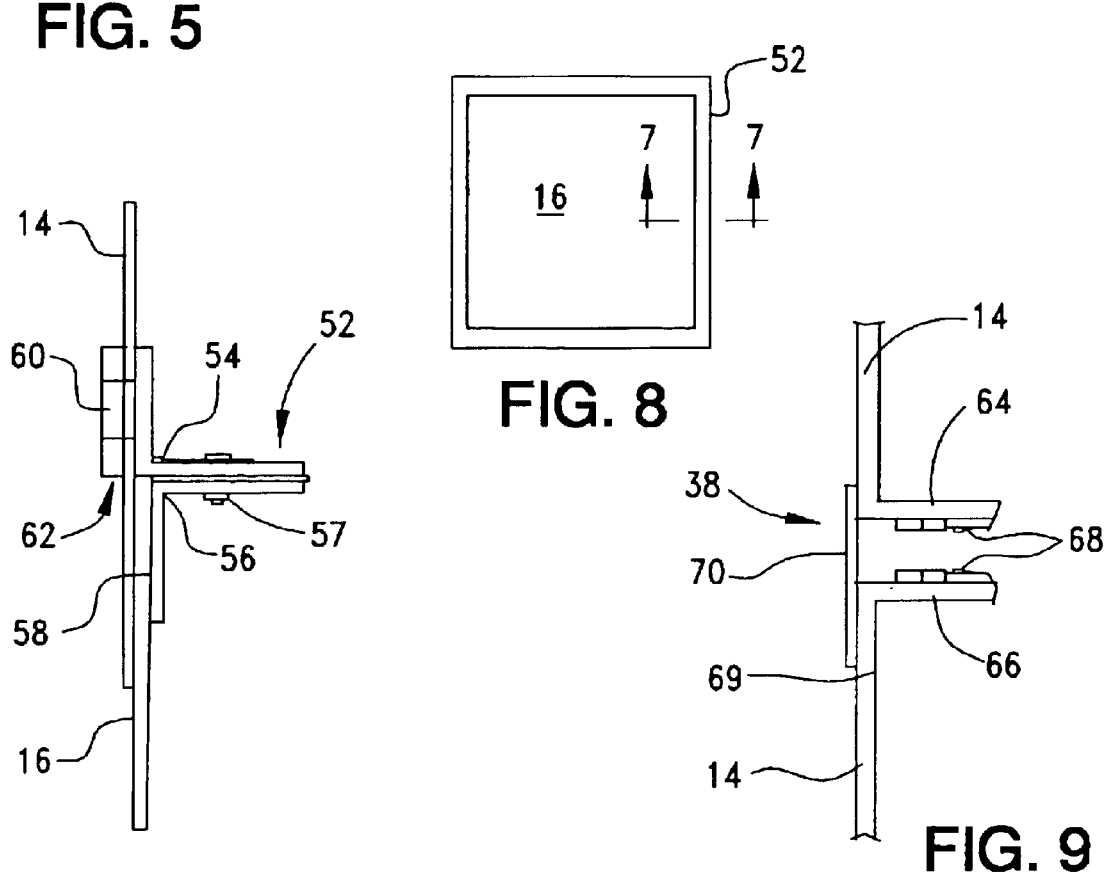
FIG. 5
FIG. 6
FIG. 8
FIG. 7
FIG. 9

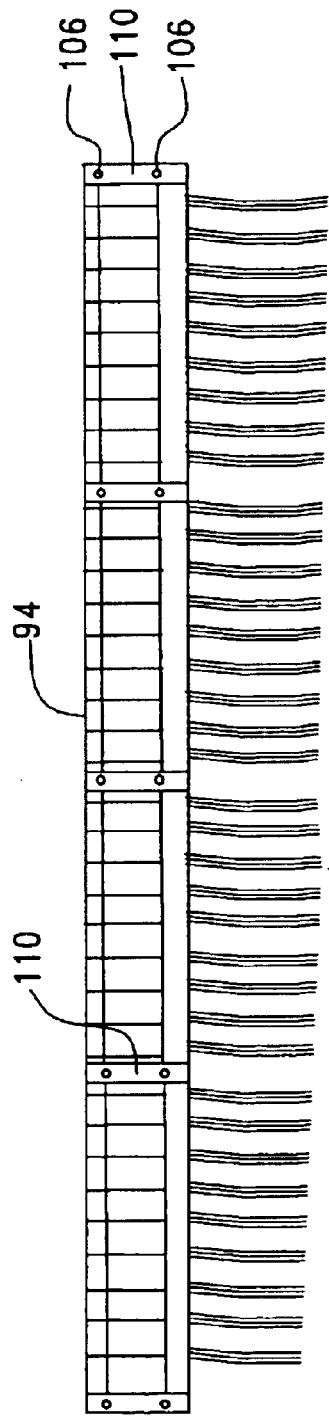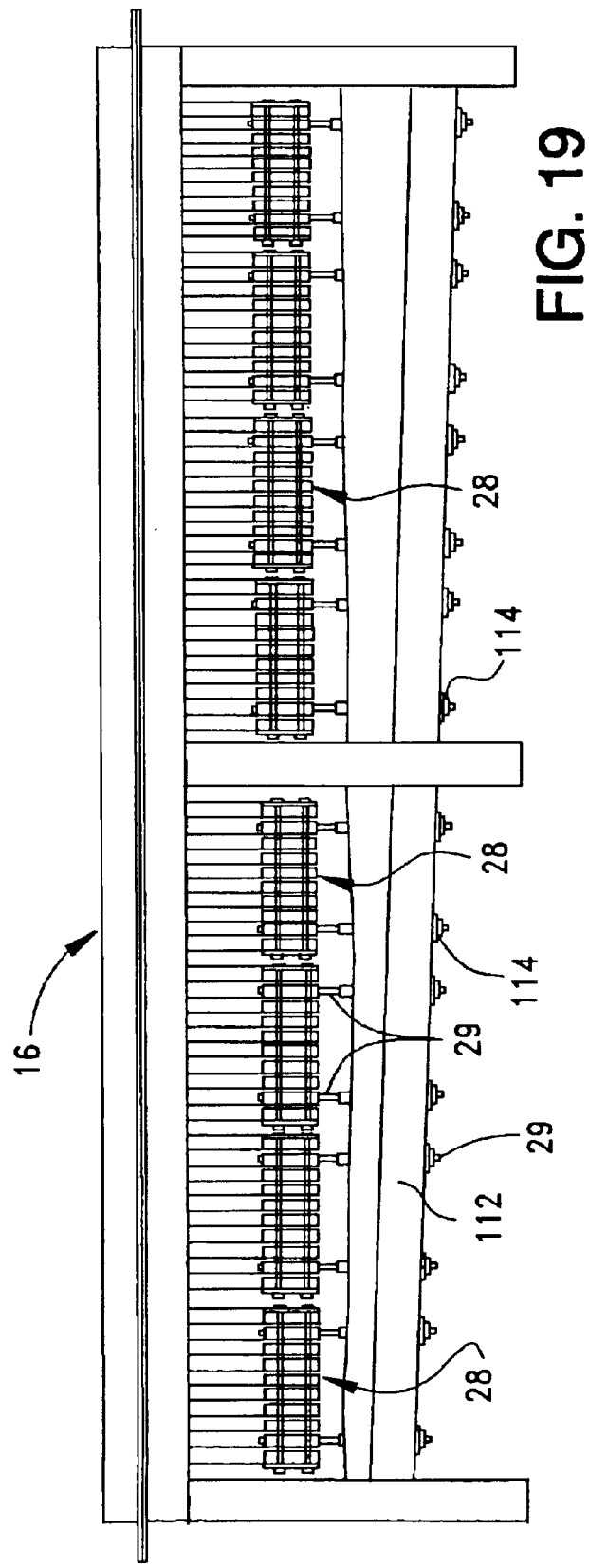

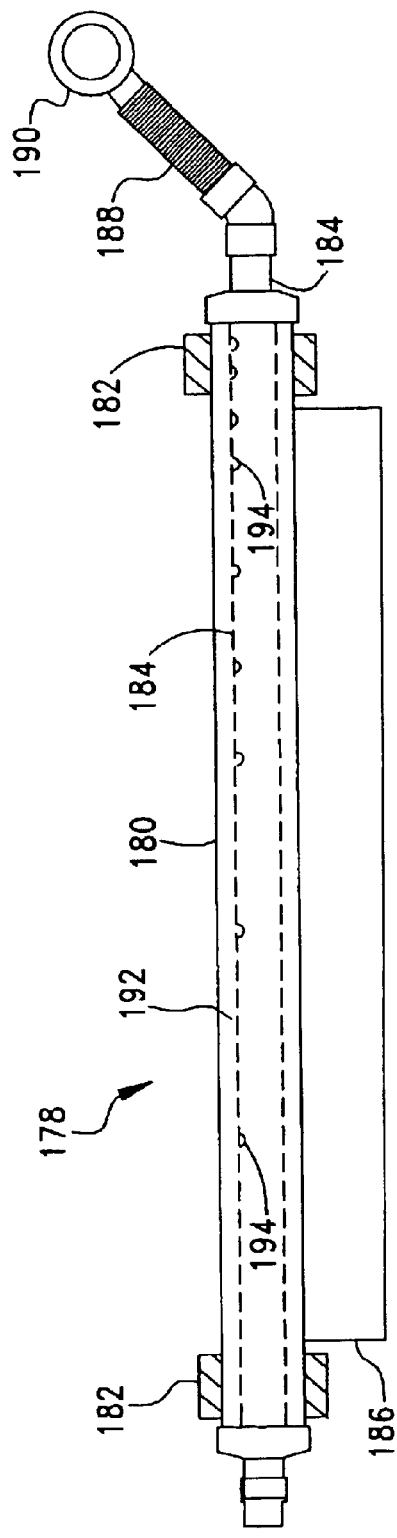
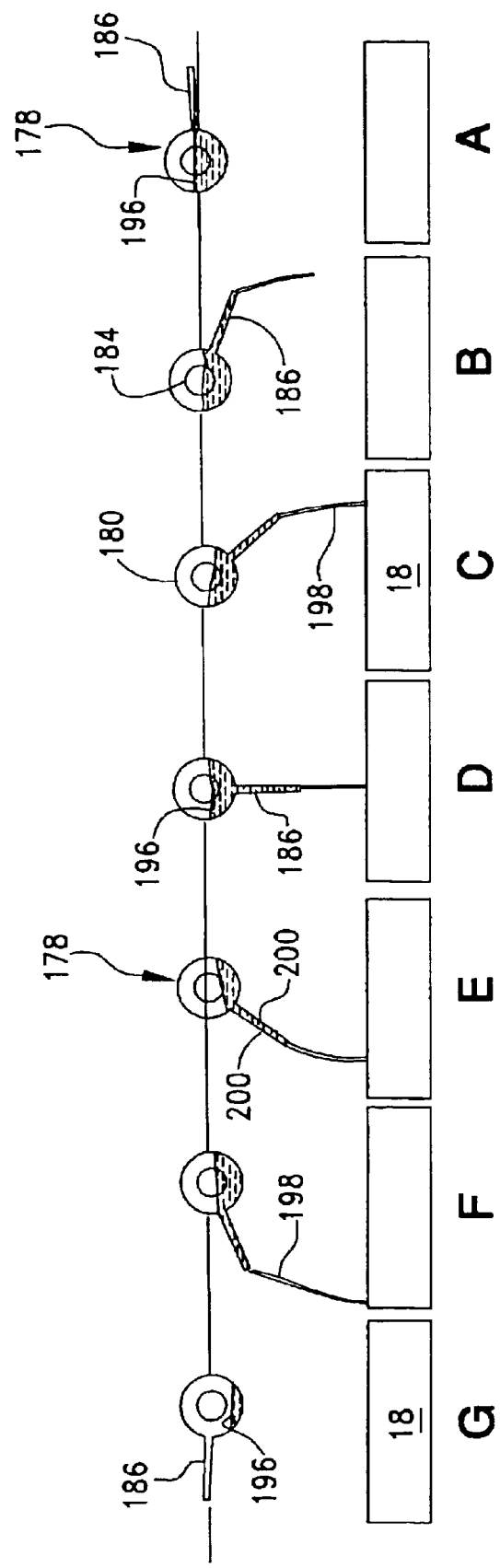

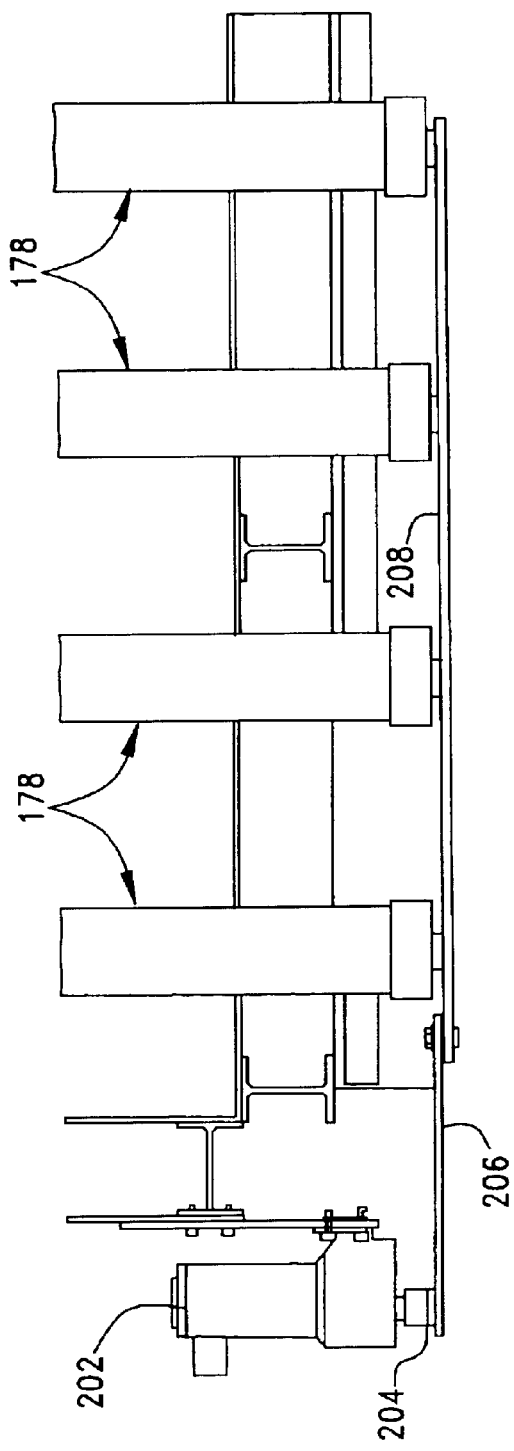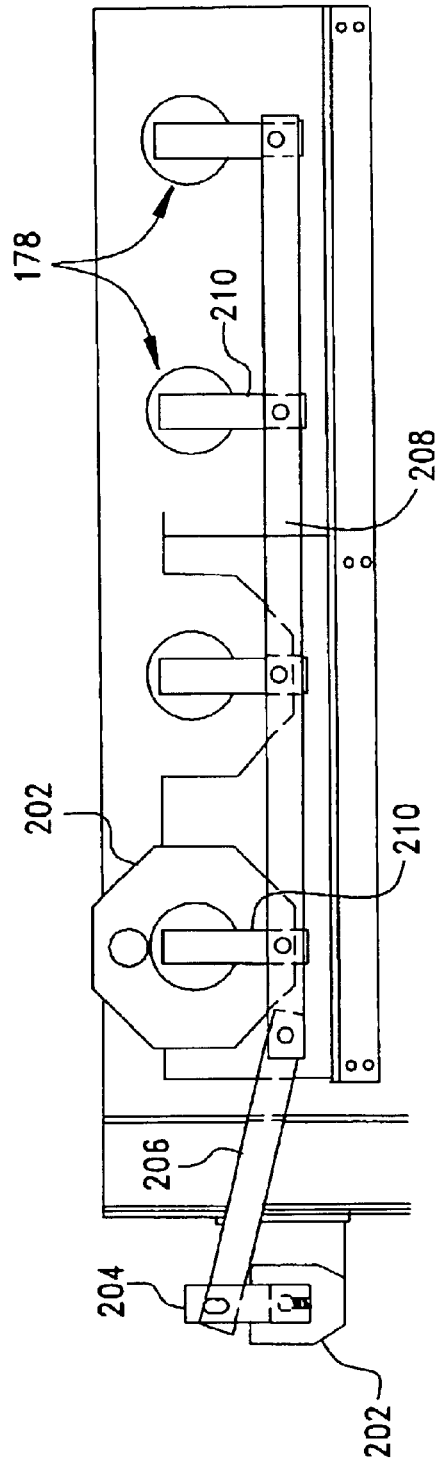

WASTEWATER TRICKLE TOWER SPRAYING ARRANGEMENT

CROSS-REFERENCE TO RELATED APPLICATION

This application claims the priority of U.S. Provisional Application Ser. No. 60/362,602 filed Mar. 8, 2002.

FIELD OF THE INVENTION

This invention relates to the treatment of wastewater using one or more trickle towers employing biomedia. This invention particularly relates to the distribution of the wastewater over the biomedia.

BACKGROUND OF THE INVENTION

With greater demands being placed on the treatment of wastewater by regulatory authorities, there has become a growing need for systems that will treat wastewater to a higher level of purity. This has also brought an increasing need for systems that are more versatile in design and can more readily be adapted to handle differing wastewater treatment requirements.

I have found that a trickle tower system employing strands of looped cord biomedia is more suited to handling today's increasing demands in wastewater treatment than the conventional systems currently in use. The initial approach of a looped cord biomedia trickle tower system is disclosed in my U.S. Pat. No. 6,241,889 published Jun. 5, 2001. While this tower system has been promising, and the general approach employed appears correct, further improvements and modifications are now desirable for more widespread adoption by industry and civil authorities.

SUMMARY OF THE INVENTION

This invention is concerned with modifying and improving the wastewater treatment process and apparatus disclosed in the above U.S. Pat. No. 6,241,889 the whole disclosure of which is hereby incorporated herein by reference.

This invention is also concerned with developing further approaches to trickle tower treating of wastewater. Some of these approaches are particularly advantageous with looped cord biomedia, and others are advantageous with other biomedia and other systems in addition to being applicable with looped cord biomedia.

The above mentioned U.S. Pat. No. 6,241,889 discloses a trickle tower having a circular horizontal cross-section. While this is certainly acceptable, there are constructional and layout advantages to having non-circular cross-sections, particularly rectangular cross-sections, as will be understood later herein.

This invention is particularly concerned with providing wastewater discharge and spraying arrangements for non-circular, as well as circular, cross-sectioned trickle towers, particularly in a way that is compatible with efficient formation of biogrowth (i.e. biomass formation) on the biomedia.

Another aspect of this invention is concerned with improving the ease, flexibility, and cost of constructing wastewater trickle towers. In this respect, it is particularly concerned with providing more flexibility with the cross-sectional shape and general construction of the trickle tower. At the same time, the invention is concerned with improving the efficiency and effectiveness of these trickle towers. A feature by which this is achieved is the use of a flexible curtain to surround at least a portion of the biomedia. One or more of these curtains can be arranged to enclose any cross-sectional shape of a trickle tower.

According to a first aspect of the present invention, there is provided a wastewater treatment apparatus comprising a support structure containing biomedia. A spray arrangement is supported by the support structure above the biomedia for spraying wastewater onto the biomedia. The spray arrangement comprises a rotatable device having at least one nozzle opening movable along a circular path as this device rotates, and at least one stationary nozzle located outwardly of this circular path. Supply means is provided for supplying wastewater to the rotatable device, and pulse means is provided for supplying pulses of wastewater to the stationary nozzle.

This nozzle arrangement enables a more uniform but intermittent spray pattern to be obtained with a trickle tower having a rectangular (including square), polygonal, elliptical, or other non-circular horizontal cross-section. In this way, most, if not all, of the biomedia can be arranged to be exposed alternately to the action of wastewater and air, providing the conditions for strong growth of biogrowth on the biomedia.

The supply means may comprise a rotatable pipe in communication with the rotatable device. The pulse means may comprise an opening in a side wall of this pipe communicating intermittently with pathways connected to the one or more stationary nozzles. When there is a plurality of stationary nozzles, the side wall opening may communicate sequentially with these stationary nozzles.

The supply means may comprise a stationary pipe, a flexible pipe, a rotatable or otherwise movable pipe, a duct, or a manifold, or any combination of these. The supply means may, but need not, include a pump; instead of a pump, wastewater supply pressure or gravity feed may be relied upon.

A flow of wastewater being supplied to the rotatable device may pass by the side wall opening, and may also pass through this opening.

The biomedia may occupy a block-like space surrounded by a sleeve-like wall. Preferably, this wall comprises a flexible curtain conforming to the horizontal cross-sectional shape of the biomedia block-like space. Further, the biomedia may comprise stands of vertical lengths of looped cord biomedia.

The spray arrangement may have a plurality of rotatable nozzle devices spaced apart over the biomedia. The spray arrangement may have a plurality of stationary pulsing nozzles located outwardly of and/or between the circular paths circumscribed by the rotatable nozzle devices.

The rotatable device may comprise one or more arms each having one or more spray nozzles openings.

According to another aspect of the present invention, there is provided a wastewater treatment apparatus comprising a support structure containing biomedia. A cascade arrangement is supported by the support structure above the biomedia for cascading wastewater downwardly onto the biomedia, with a receptacle below the biomedia for receiving wastewater falling therefrom. The cascade arrangement comprises an oscillatable manifold extending in a longitudinal direction across the biomedia and oscillatable about a horizontal axis, the manifold having a slot nozzle extending in the longitudinal direction but spaced from the axis and directed away from the axis.

Preferably, the slot nozzle extends parallel to the axis of oscillation of the manifold, but may be curved about this axis. The nozzle may have outwardly directed flanges or lips.

Preferably, a perforated pipe extends inside the manifold for distributing wastewater in the manifold. In this way, the uniformity of the cascade of wastewater can be improved, and the cascade can be formed as a more uniform sheet of wastewater. The perforated pipe may extend into the manifold from one end of the manifold and receive wastewater through this one end. The perforations of the perforated pipe may vary in spacing or size along the length of this pipe. It has been found, that an improved flow pattern can be obtained by allowing a greater exit area for wastewater nearer the end of the perforated pipe through which wastewater enters, than the opposite end. This opposite end is preferably closed. The perforations may be in an upper surface of the pipe.

The biomedia may have a rectangular horizontal cross-section with oscillation of the manifold in use effecting an intermittent discharge of sheets of wastewater through the slot nozzle progressively over at least a portion of this rectangular cross-section.

The manifold may be rotatably supported in bearings at opposite axial ends, and the elongate nozzle may extend lengthwise between these bearings. The nozzle preferably has outwardly extending flanges between which the wastewater discharges from the manifold. These flanges may be parallel, or may diverge as they extend outwardly to be self-clearing.

Preferably, the biomedia strands comprise spaced-apart lengths of looped cord, and these lengths preferably extend vertically parallel to each other and are placed under tension. However, other forms of strands, such as strips of plastic, cloth, etc., may be employed, as may other configurations.

Preferably, the nozzle oscillates between two end positions, one on each side of its axis of oscillation. The nozzle may dwell at each of the two end positions, this allowing more breathing time for the biomedia between successive cascades of wastewater. It also allows time for the manifold to recharge with wastewater before the next cascade starts.

One or more stationary nozzles may be combined with one or more oscillatable manifolds for more effectively covering biomedia of particular cross-sectional area. Pulse means may be provided for supplying pulses of wastewater to the stationary nozzle or nozzles.

There may be a plurality of cascade arrangements, preferably parallel to each other, and preferably oscillated by a common drive.

According to yet another aspect of the present invention there is provided an apparatus for treating wastewater comprising a trickle tower containing biomedia and at least one outlet from which wastewater is discharged onto the biomedia. A receptacle below the biomedia receives wastewater falling from the biomedia, and a flexible curtain is suspended in the trickle tower and extends down to the receptacle, the curtain surrounding the biomedia.

The outlet may comprise a movable nozzle, or a stationary nozzle, or an oscillatable nozzle of an oscillatable manifold, or any combination of these.

A hood may extend over the biomedia and the outlet, and the curtain may be sealed to the hood and to the receptacle.

Other objects, features, and advantages of the present invention will become more fully apparent from the following detailed description of the preferred embodiments, the appended claims, and the accompanying drawings.

BRIEF DESCRIPTION OF THE DRAWINGS

In the accompanying drawings, in which like reference characters in the same or different Figures indicate like parts:

FIG. 5 is a partial schematic elevational view in the direction of the arrow 5 in FIG. 4;

FIG. 6 is a partial schematic elevational view of the lower section of a cell of the apparatus of FIG. 1 showing the lower part of the curtain inside a base receptacle;

FIG. 7 is a section on the line 7—7 of FIG. 8 showing details of sealing the curtain to the inside of the base receptacle;

FIG. 8 is a simplified plan view of the base container of FIGS. 6 and 7;

FIG. 9 is a diagrammatic plan view of an openable vertical connection in the curtain of FIGS. 3 and 5;

FIG. 18 is a side view of a modification of the grate of FIG. 15 showing the upper portions of the biomedia strands extending downwardly from the upper structure of the grate;

FIG. 19 is a simplified elevational view of a base receptacle for the apparatus of FIG. 1 showing the lower portions of eight grates anchored to the bottom of the receptacle;

FIG. 26 is an elevational view, partly in section, of an oscillating manifold according to another embodiment of the invention;

FIG. 27 is a schematic diagram showing the manifold of FIG. 26 in seven different operating positions A to G during half of a full operating cycle;

FIG. 28 is a simplified plan view of four manifolds as in FIG. 26 linked together and commonly driven; and FIG. 29 is a simplified elevational view of the linking and oscillating arrangement in FIG. 28.

DETAILED DESCRIPTION OF THE PREFERRED EMBODIMENTS

Figure 1:
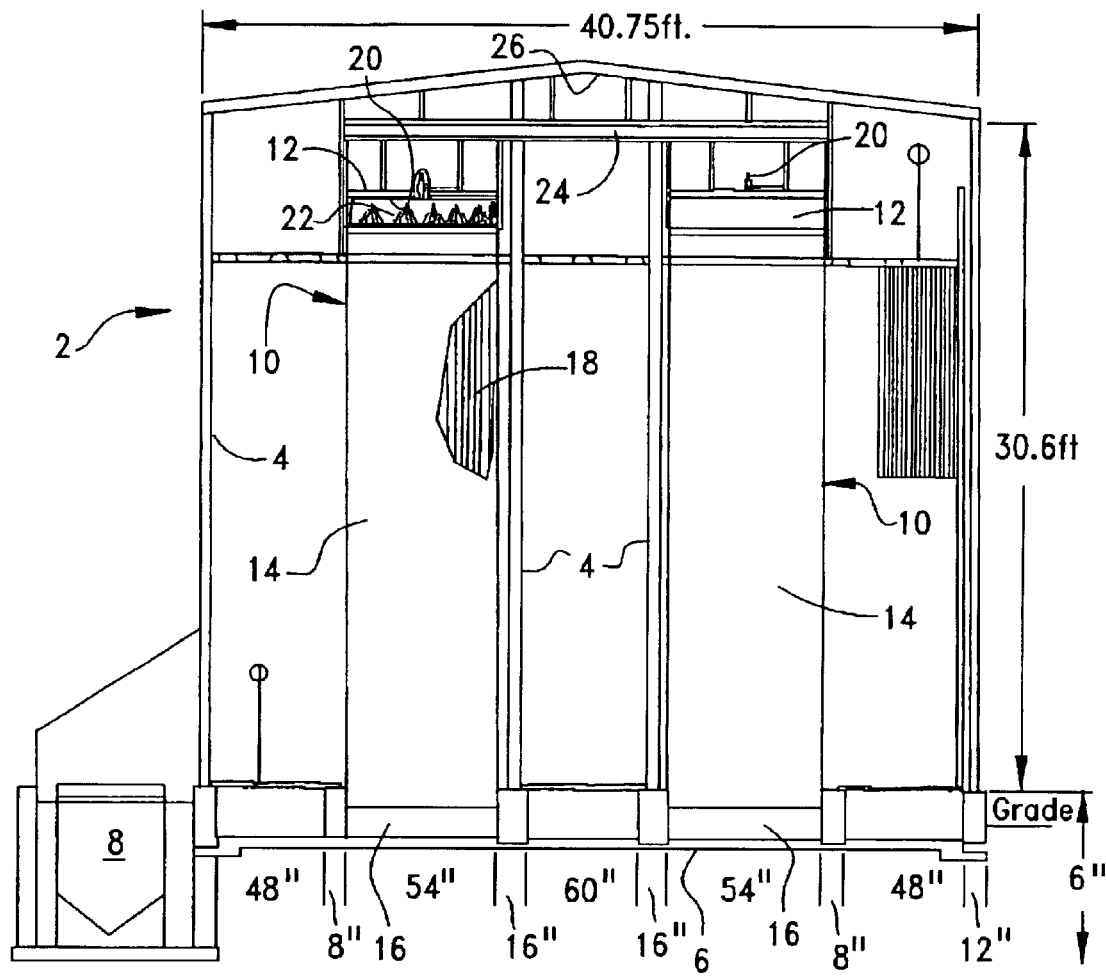
FIG. 1 is a schematic vertical section of a trickle tower wastewater treatment apparatus embodying the present invention.

FIG. 1 shows an exterior, weatherproof, steel building 2 having a support structure 4 erected on a concrete base 6, with a covered recirculation tank 8 outside the building. Two wastewater treatment cells 10 are shown. Each cell 10 has an upper closure hood 12, with a flexible curtain 14 draped around the hood 12 and extending downwardly into a base receptacle 16 formed on the concrete base 6. Biomedia 18 is enclosed by the curtain 14, and a wastewater spraying or discharge system 20 is mounted inside the hood 12 above the biomedia, both as shown through broken away portions of the left cell 10. Various embodiments of the system 20 will be described in greater detail later, particularly with reference to FIGS. 21 to 29. Wastewater 22 from the system 20 flows down the biomedia 18 and drips into the base receptacle 16, illustrated as a base tray from which the partially treated wastewater flows to the recirculation tank 8 for recirculation to the system 20 of the same or another cell. Of course the base receptacle 16 could be constructed as a recirculation tank, so eliminating the outside recirculation tank 8. The hoods 12 are suspended by structural members 24, 26 supported by and forming part of the building structure 4, for example the roof rafters. The curtains 14 are attached and sealed to the outside of the hoods 12, and to the inside of the base receptacles 16.

Figure 2:
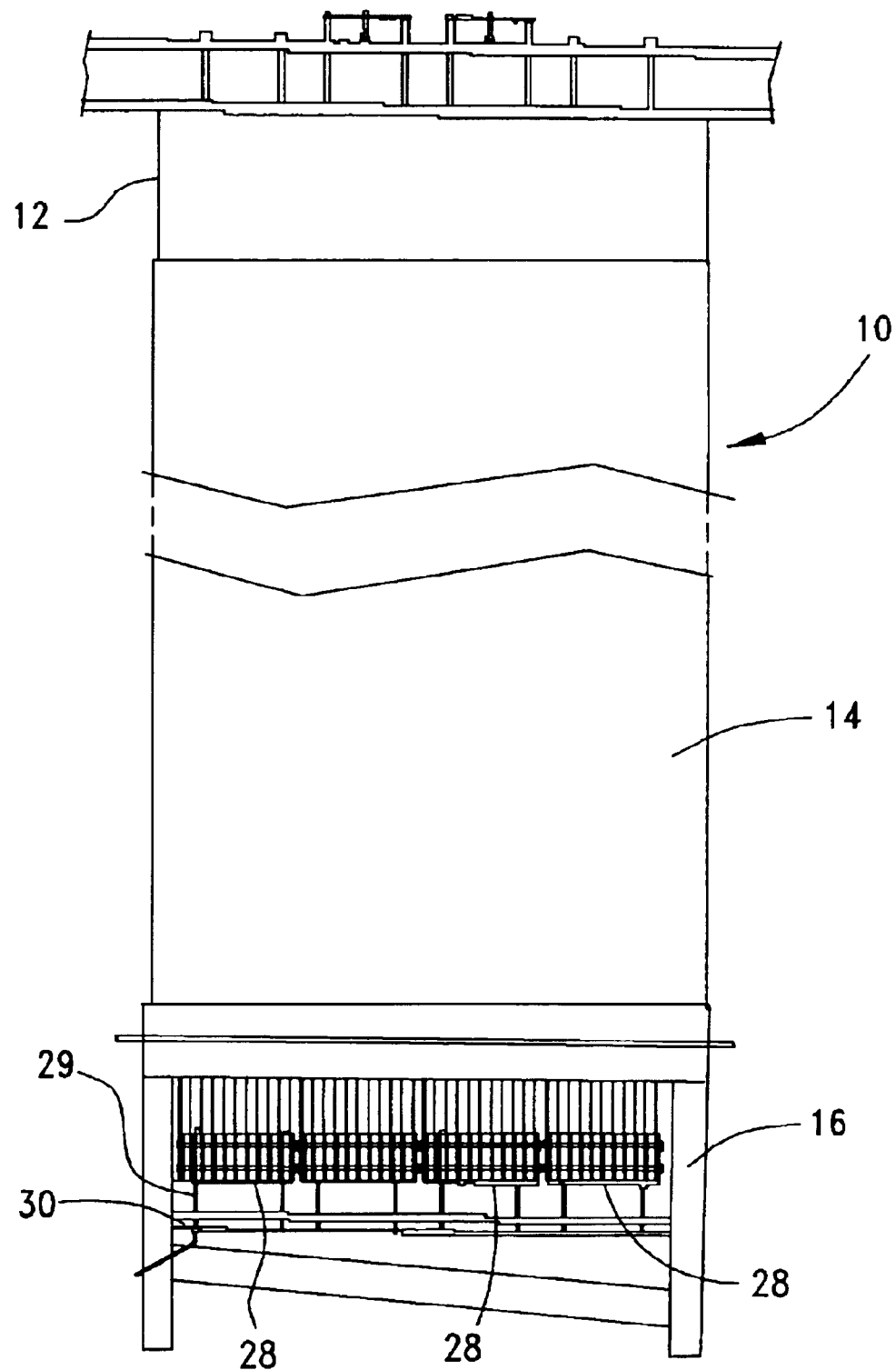
FIG. 2 is an elevational side view, with parts removed for clarity, of a single cell unit of the apparatus of FIG. 1.

FIG. 2 shows one of the cells 10 in side view, the curtain 14 surrounding and defining this cell, extending downwards from the outside of the hood 12 to the inside of the base receptacle 16. Although various types of biomedia could be used inside the confines of the curtain 14, looped cord biomedia is preferred, and preferably the looped cord biomedia is tensioned vertically. To show such a arrangement, the side of the base receptacle 16 has been omitted to expose lower ends of four grates 28 (described in detail later) attached by adjustable tensioning bolts 29 to an anchor bar 30 extending horizontally across the base receptacle 16. These tensioning bolts 29 are a slip fit through holes in the anchor bar 30, to allow the bolts 29 to slip downwardly through the anchor bar 30, should any grate 28 lengthen and drop down a little in use due to the weight of the biomass forming on the biomedia strands of the grate. This prevents such strands from sagging in use, and further mitigates the possibility of biomass adversely bridging between adjacent biomedia strands.

Figure 3:
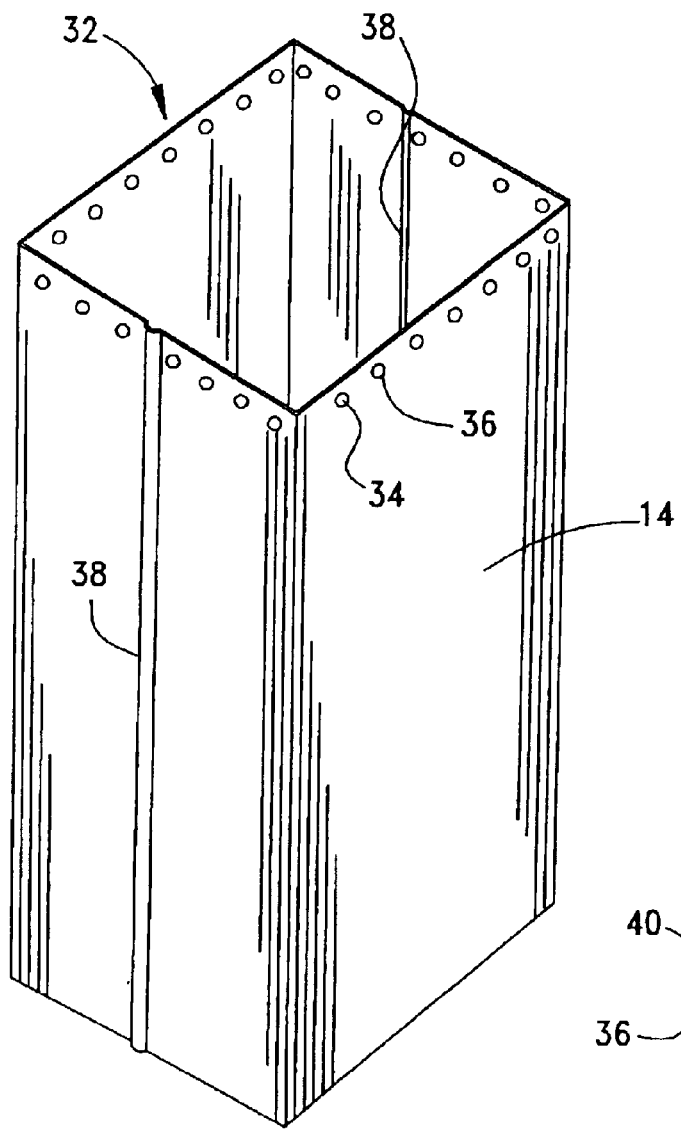
FIG. 3 is a diagrammatic perspective view of a curtain, according to an aspect of the invention, that surrounds one or more treatment cells in the apparatus of FIG. 1.

FIG. 3 illustrates in perspective view one of the curtains 14. It forms a tube-like casing, preferably made of flexible plastic sheeting, for example polyvinylchloride, polypropylene, etc. Due to the flexibility and deformability of the sheeting, the tube-like casing can have any required cross-sectional shape. As shown, it has a square cross-section 32; however, the cross-section may be rectangular, elliptical, circular, etc. In this way, the curtain 14 can be adapted to closely surround and define any shaped block of biomedia, whether solid biomedia, suspended strips, or looped cord. Around the top of the curtain is a series of small holes 34 reinforced by metal (preferably stainless steel) grommets 36. These holes are hooked over pegs extending from the hood (shown in FIGS. 4 and 5); this serves as an aid when mounting the curtain 14 around the hood 12, and it also provides physical support for the curtain 14 once mounted. Extending the full vertical length of the curtain 14 is at least one releasable fastener 38 closing an opening or slit in the curtain. There may be two, three, four or more such releasable fasteners 38, two being shown. These fasteners may comprise a standard type releasable zipper, preferably of plastic material, as used with outer coats such as Parkas, or may comprise any other type of releasable connection suitable around wastewater. Preferably, this fastener comprises inter-engaging looped and hook strips as sold under the trademark VELCRO, with attention being paid to the material and adhesive of the inter-engaging strips to resist reaction with the particular wastewater being treated. One function of the releasable fastener(s) is to facilitate assembly and mounting of the curtain 14 around the biomedia; this enables the biomedia to be assembled in place and then the curtain hung around the biomedia. Another function is to provide ready access to the biomedia, particularly for inspecting the condition of the biomedia in use, and for repairing or replacing the biomedia. Although the releasable fastener 38 preferably runs the full length of the curtain, one or more of these fasteners may extend only for a portion of the length of the curtain 14.

Figure 4:
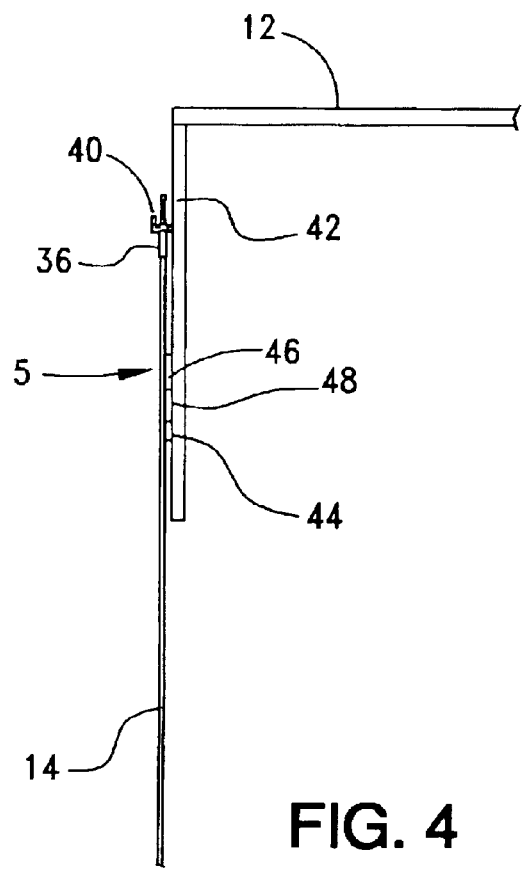
FIG. 4 is a partial vertical section illustrating the connection of the top of the curtain of FIG. 3 to a hood part of the apparatus of FIG. 1.

FIG. 4 shows the attachment of the top of the curtain 14 to the hood 12. One of the grommets 36 at the top curtain edge is engaged over an L-shaped peg or hook 40 mounted on the outside of the hood's downwardly extending sidewall 42. Below the peg 40 are two spaced-apart releasable hook and looped connections 44, 46 (i.e. two pairs of VELCRO connections). These connections extend all the way around the hood 12, and sealingly reinforce attachment of the top of the curtain 14 to the hood. Mounted on the hood between the two releasable connections 44, 46, is a sealing strip 48 of rubber or other gasket material, which also extends all around the hood 12. This sealing strip 48 is resiliently compressible, and presses against the inside of the curtain to ensure both a watertight and an airtight joint between the curtain 14 and the hood 12.

FIG. 5 further illustrates the sealed connection of the upper portion of the curtain 14 to the hood 12. As can be seen, there is a series of L-shape pegs 40 spaced apart around the hood. The vertically spaced-apart VELCRO strip connections 44, 46 can be seen above and below the continuous horizontal sealing strip 48; however, these strip connections and sealing strip are covered and concealed by the curtain 14, but are shown through the curtain in FIG. 5 for the purpose of illustration.

FIG. 6 illustrates the base receptacle 16 with a transparent sidewall 50, to show the bottom of the curtain 14 extending down inside the base receptacle.

FIG. 7 is a fragmentary section illustrating the sealing of the bottom of the curtain 14 to the inside of the base receptacle 16. FIG. 8 is a plan view of the top of the base receptacle showing a flange 52 around the outside of the base receptacle 16. FIG. 7 is a section on the line 7—7 of FIG. 8 showing the outside flange 52 formed by two right angle steel bars 54, 56 bolted together at 57. The lower bar 56 is welded to an outside upper lip 58 of the base receptacle 16, and the upper bar 54 is bolted to a flat bar 60 on the inside of the curtain 14, the curtain being sealingly clamped therebetween. In this way, a both water and air tight joint 62 is formed between the bottom of the curtain and the inside of the base receptacle. Adhesive may be used between all mating surfaces and, in addition, a gasket may be sandwiched between the two right angle bars 54, 56 to further ensure the tightness of this joint.

FIG. 9 illustrates a way to make each releasable vertical connection 38 water tight and substantially air tight. At each connection 38, the adjacent edges of the curtain 14 have outwardly extending right angle flanges 64, 66. The facing sides of these flanges 64, 66 each carry a complementary strip 68 of VELCRO or the like, these flanges and strips extending the full vertical length of each curtain edge. On the inside of one curtain edge is welded at 69 a vertical sealing strip 70 of plastic material, e.g. PVC, this strip overlapping the other vertical curtain edge in a sliding and sealing relationship. When the two right angle flanges 64, 66 are physically brought together, the complimentary VELCRO strips 68 sealingly and securely engage, and the flap formed by the internal sealing strip 70 slides over and against the surface of the adjacent curtain portion 14 to seal the vertical releasable connection 38.

To assemble the curtain 14 around the biomedia 18, the curtain is first supported by placing grommets 36 over hooks 40, next the pair of VELCRO strips 46 are pushed together, then the pair of VELCRO strips 44 are connected so squeezing the gasket 48. The bottom of the curtain is next connected and sealed to the base receptacle 16. Finally, the releasable connection 38 is sealed by pressing its VELCRO strips 68 together.

Instead of using one or more releasable fasteners, the edges of the curtain may be more permanently attached together during or after installation. This could be done by welding, sewing, stapling, riveting, etc. Although this would hamper subsequent access to the biomedia, it would still enable the advantages of flexibility of shape and cost saving to be obtained.

Figure 10:
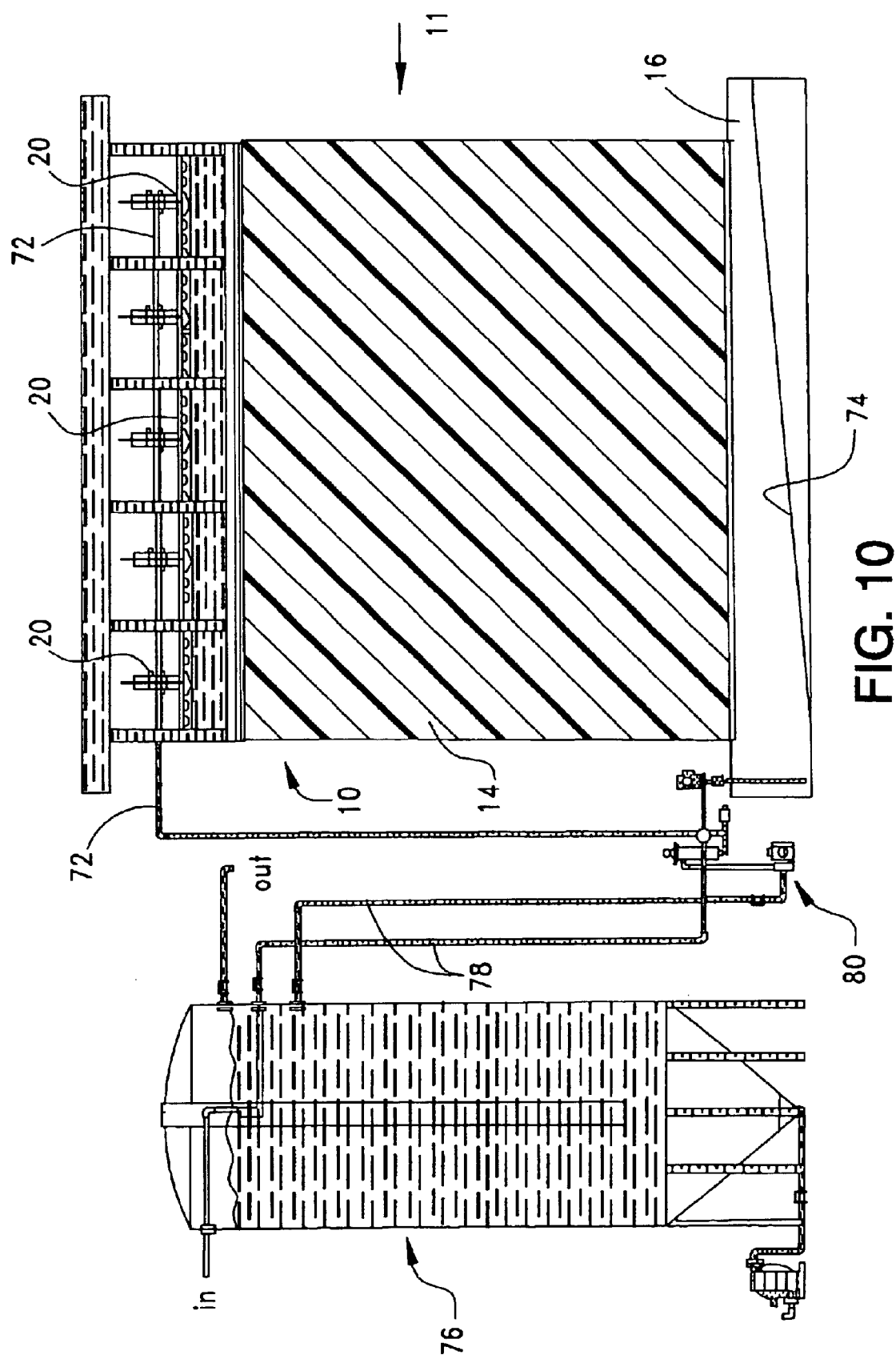
FIG. 10 is a schematic elevational view, partly in section, of another version of the apparatus of FIG. 1.

FIG. 10 illustrates in side view a variant of the apparatus of FIG. 1 and shows an elongate treatment cell 10 surrounded by a curtain 14. At the top of this cell 10 are five wastewater spray or discharge units 20 fed by a common supply pipe 72. An elongate base receptacle 16, with a downwardly inclined floor 74, communicates with an external freestanding recirculation tank 76 and the units 20 via pipes 78 and a pump system 80 which effects recirculation of the wastewater through the cell 10.

Figure 11:
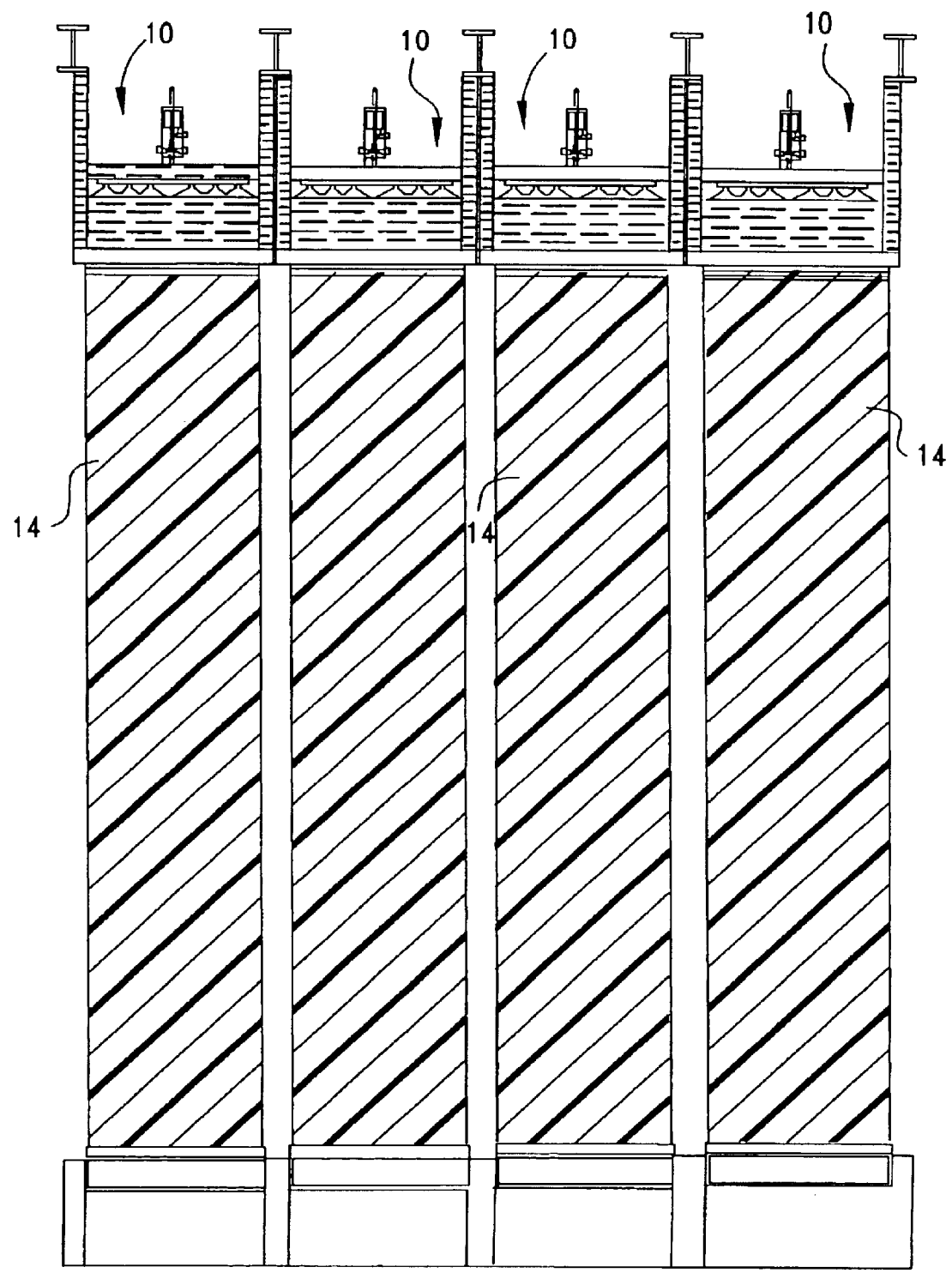
FIG. 11 is a schematic elevational view in the direction of the arrow 11 in FIG. 10.

FIG. 11 is an end view of the apparatus of FIG. 10, and shows four similar treatment cells 10 side by side. Each of these cells 10, and the biomedia therein, is surrounded and contained by a separate curtain 14. By viewing FIG. 11 in conjunction with FIG. 10, it will be realized that each cell 10 has an elongated rectangular horizontal cross-section.

When the horizontal cross-section of a cell is circular, a rotating spray device, such as shown and described in previously referenced U.S. Pat. No. 6,241,889, would be satisfactory. However, with non-circular horizontal cross-sections, for instance square, oval, and rectangular cross-sections, a circular spray pattern may leave corner and/or end or other sections starved of sprayed wastewater. To overcome this, stationary spray nozzles may additionally be placed in the corners, or any other area missed by the circular spray pattern. These stationary nozzles preferably should be given a pulsing action to provide the sprayed biomedia with an opportunity to receive alternately wastewater and air. This pulsing can be achieved using power-operated on/off valves, intermittent pumping, injectors, or an intermittent flow diversion system. A preferred way of achieving this pulsing is described later.

Alternately, an oscillating spray or discharge system could be employed, preferably oscillating about a horizontal axis extending across the cross-section of the biomedia. A preferred arrangement for achieving this with a cascade system is described later.

Figure 12:
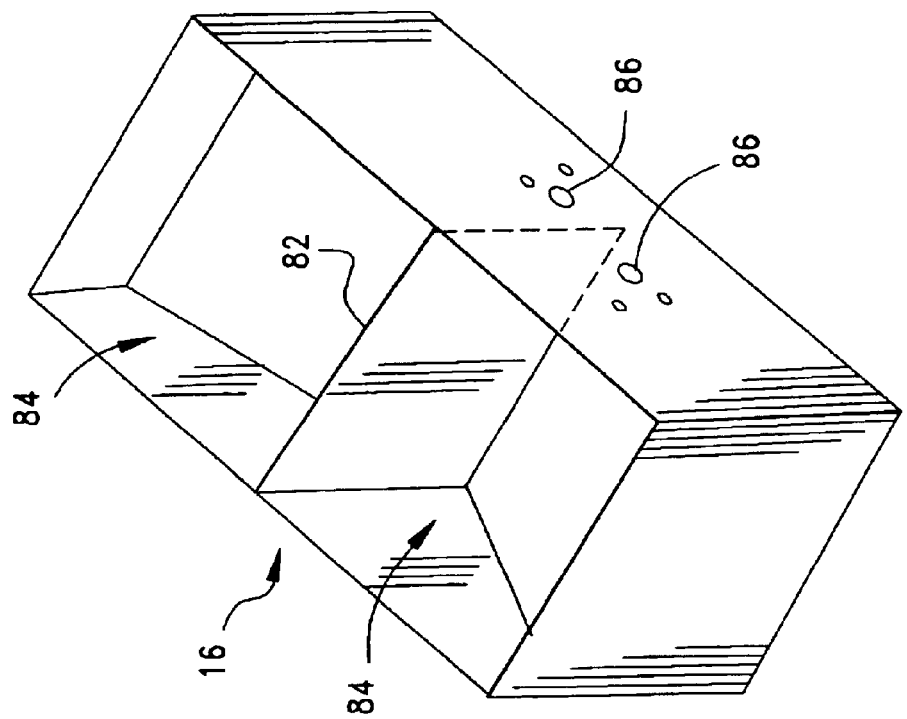
FIG. 12 is a diagrammatic perspective view of a base receptacle partitioned for use with two cells to be surrounded by a common curtain.

FIG. 12 illustrates a base receptacle 16 for use with two treatment cells contained in a common surrounding curtain 14. A partition 82 in the base receptacle 16 divides it into two separate drip trays 84, each with its own set of outlet ports 86. Each cell would be of square cross-section, whereas the single curtain wall would be of elongate rectangular cross-section.

The above illustrates how the flexible curtain can be used to accommodate a variety of different shapes and arrangements. It does so in a way that is easy and inexpensive to install, relatively inexpensive to manufacture, may facilitate inspection of and access to the biomedia, and offers flexibility for different installation configurations. Further, these curtains are virtually maintenance free.

Figure 13:
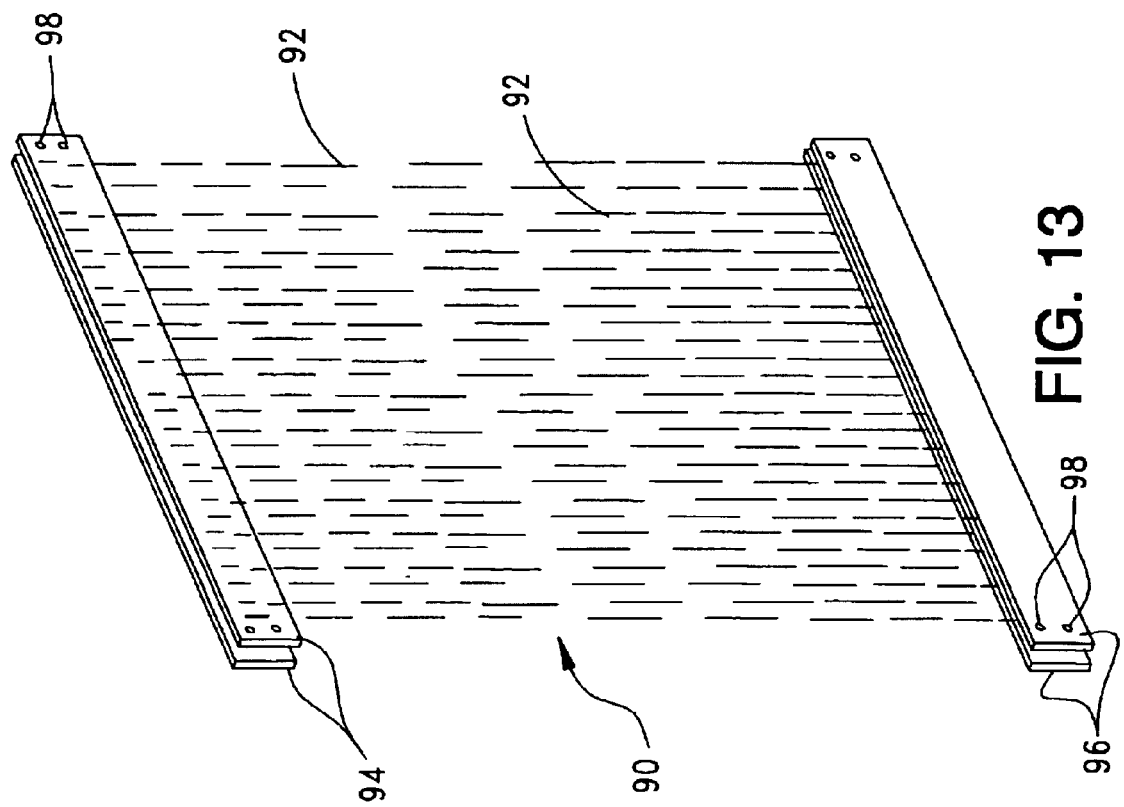
FIG. 13 is a diagrammatic perspective view of a biomedia hanger frame used according to the invention in the apparatuses of FIG. 1 and FIG. 10.

FIG. 13 illustrates a frame or hanger 90 of looped cord biomedia. The hanger frame 90 has a plurality of discrete lengths 92 of looped cord biomedia extending between upper and lower pairs 94, 96 of hanger bars. The ends of the looped cord 92 are clamped between the respective pairs of bars. The pairs of bars are secured together by gluing, although this could be done by spot welding, the bars preferably being made of plastic material, for example ABS. Each end of each pair of bars has a pair of vertically spaced-apart holes 98 for assembling a plurality of hangers together. When the pairs 94, 96 of bars are stretched apart, the lengths 92 of looped cord are spaced apart parallel to each other. The ends of the lengths of looped cord may be cut off flush with the adjacent pair of clamping bars, or may extend just beyond the bars. In the latter case, these extending ends may be heat-treated to cause them to fuse and form enlarged ends to more securely retain the ends from pulling through between the pair of clamping bars.

These hangers are preferably manufactured as a series of links connected together and rolled up into a somewhat cylindrical roll. This is done by forming a warp of strands of looped cord biomedia and clamping a pair of hanger bars across this warp. The warp is then advanced the desired length for the hanger, and another pair of hanger bars clamped across the warp. Thereafter, the warp is advanced a short distance (e.g. 1 to 4 inches) and another pair of hanger bars (to form the beginning of the next hanger) clamped across the warp. This process continues with the hangers being reeled onto a spool as further hangers are formed. Individual hangers can be then cut from the spool as required. If the cutting is performed by a hot-air knife, the cut ends of the looped cord biomedia fuse as mentioned above.

The looped cord biomedia is preferably made from knitted yarn, e.g. polyester or PVDC yarns. If the knitted structure enables the loops to be orientated in one axial direction, then in the grate, all such loops should be orientated in the same direction. This is enabled by having discrete cut lengths of biomedia formed from a warp. When assembled in a trickle tower, all such loops would be orientated upwards.

Figure 14:
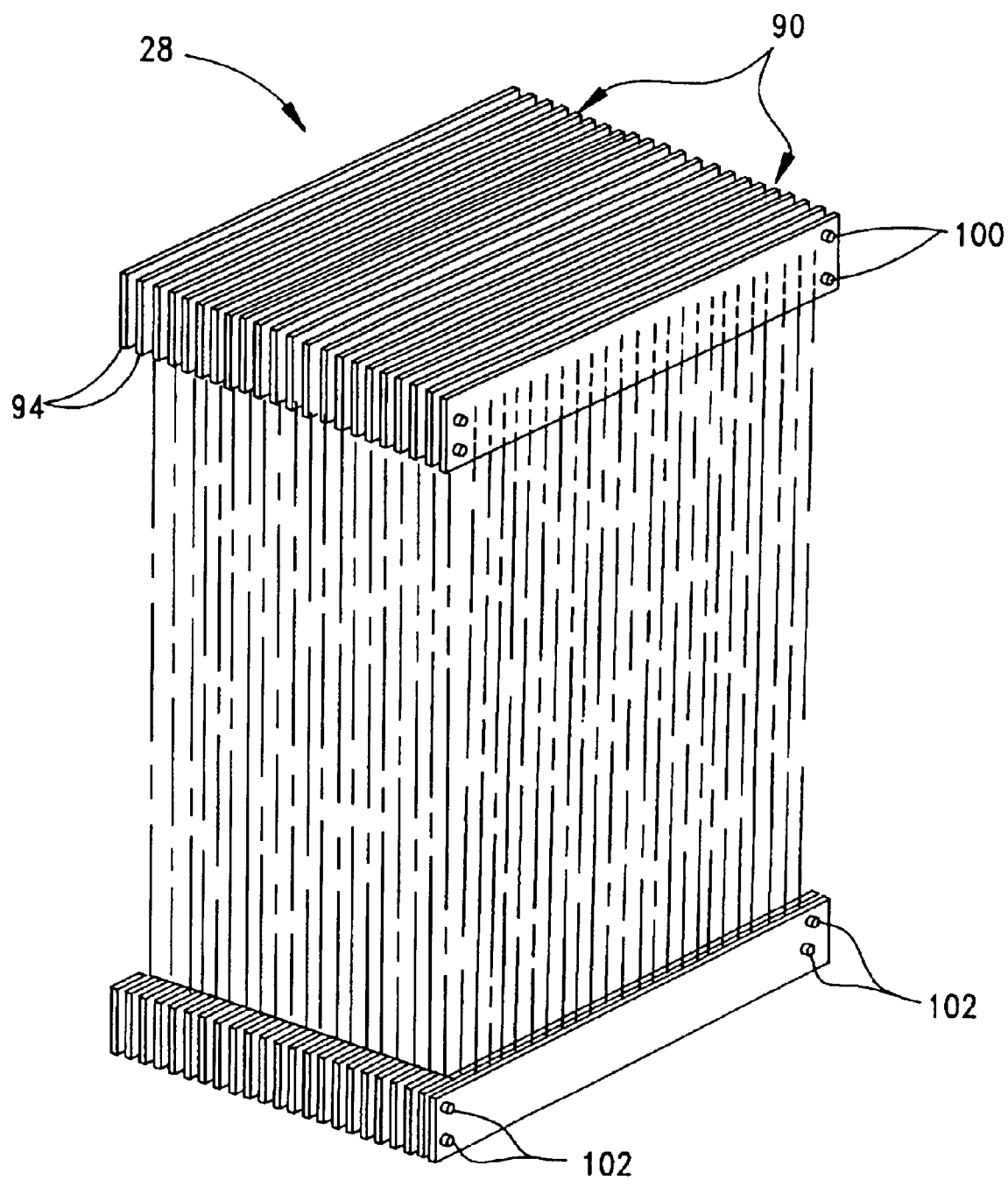
FIG. 14 is a diagrammatic simplified perspective view of a biomedia grate made up of a plurality of the hanger frames of FIG. 13.

FIG. 14 shows a plurality of hanger frames 90 connected together to form a grate 28. The upper pairs of hanger clamping bars 94 are rigidly bolted together by a pair of bolts 100 at each end through the holes previously mentioned. The lower pairs of hanger clamping bars 96 are similarly rigidly bolted together by bolts 102. Spacers keep the pairs of bars correctly spaced apart.

Figure 15:
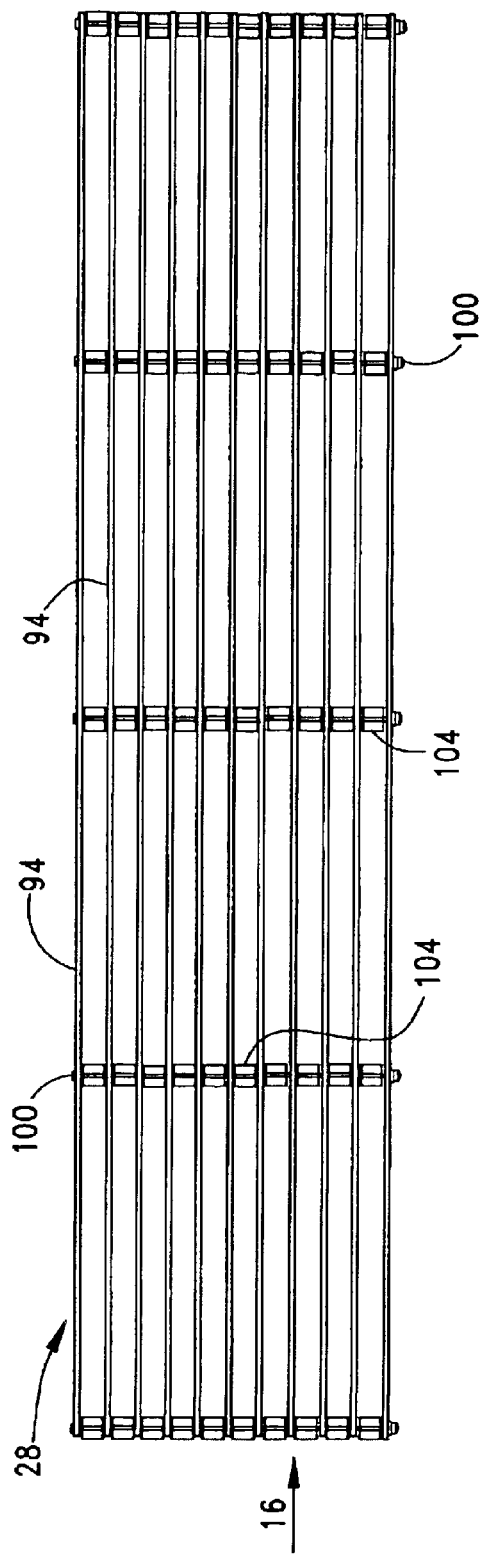
FIG. 15 is a plan view of the grate of FIG. 14.

FIG. 15 shows in plan view the top of the grate 28, although the pairs 94 of hanger bars are relatively longer than in FIG. 14. Eleven pairs of hanger bars are equally space apart by spacers 104 cut from square aluminum tubing. With this longer grate 28, five pairs 100 of equally spaced-apart bolts pass through the bars and the spacers. In this way, the upper pairs 94 of bars are rigidly secured together; the lower pairs of bars of this grate are similarly rigidly secured together.

Figure 16:
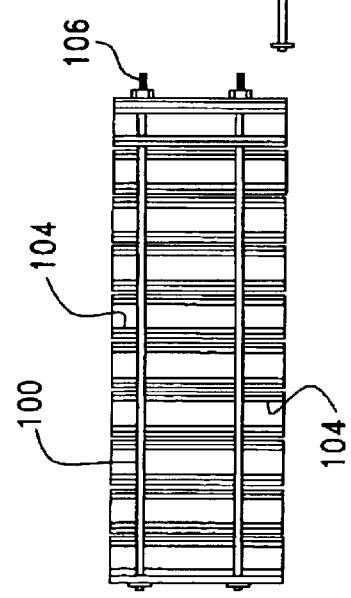
FIG. 16 is an end view of the upper structure of the grate in the direction of the arrow 16 in FIG. 15.
Figure 17:
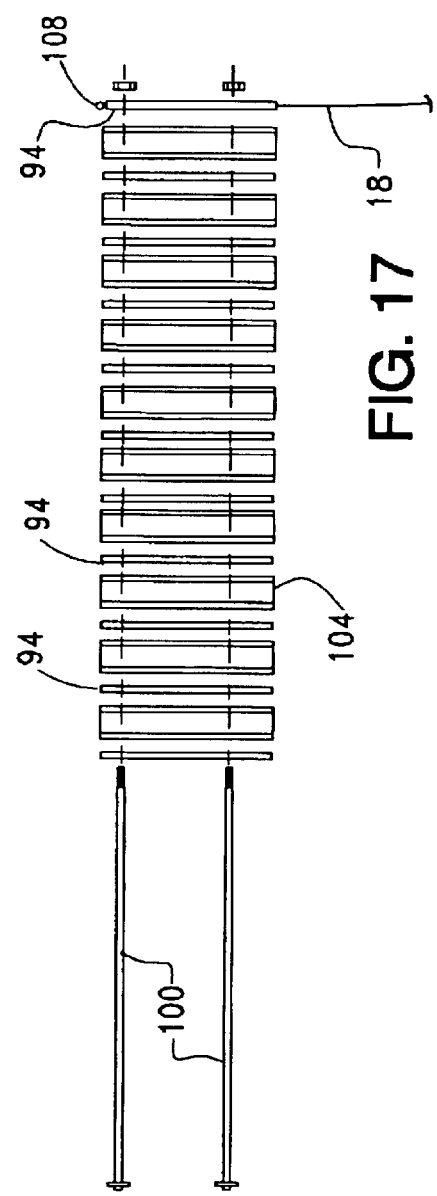
FIG. 17 is an exploded view of FIG. 16 additionally showing a portion of a strand of biomedia.

FIG. 16 is an end view of the upper hanger bars of the grate in the direction of the arrow 16 in FIG. 15 (the lower hanger bars would look the same). The connecting and securing bolts 100 are tightened by their nuts 106 at the right end in FIG. 16. The hollow spacer tubes 104 extend vertically between the pairs of clamping bars for the full height thereof. FIG. 17 is an exploded view of FIG. 16, but also showing a strand 18 of looped cord biomedia clamped between the right outermost pair of clamping bars and extending downwardly therefrom; the upper cut end 108 of the strand 18 can be seen extending slightly above the hanger bars. Although the strands of biomedia are clamped between the pairs of clamping bars before these are assembled into a grate, the subsequent tightening of the grate bolts 100 further aids the securing of the biomedia ends. This improves the integrity of the grate 28, and enables the biomedia strands to be able to carry heavier weights of biomass, during operation when purifying wastewater, without the biomass loaded strands tending to pull through the upper clamping bars.

FIG. 18 shows an elevational view of the grate of FIG. 15 with the beginning of the strands of biomedia 18 extending down from the upper bars 94. A modification is also shown in the form of reinforcing anchor strips 110 between the nuts 106 and the outer plastic hanger bar.

FIG. 19 is a view similar to the bottom portion of FIG. 2, but showing the lower anchoring and tensioning bolts 29 for the multiple grates 28 passing through the bottom 112 of the tank 16. Also, this base receptacle 16 is of double width to function as a common base receptacle for two side-by-side treatment cells, each cell having four grates 28. When the through bolts 29 are tensioned by adjusting their nuts 114 underneath the raised bottom 112 of the tank, the lengths of looped cord biomedia (or any other biomedia strands employed) are tensioned and kept in spaced-apart parallel vertical alignment. The bolts 29 slidingly pass through tubes extending through and sealed to the bottom 112 of the base receptacle 16, these tubes extending upwardly to above the level of the wastewater in the base receptacle 16 as shown. This enables the lower ends of the grates to move downwardly slightly, should the biomedia stretch under the weight of the biomass forming on it during processing of the wastewater.

Figure 20:
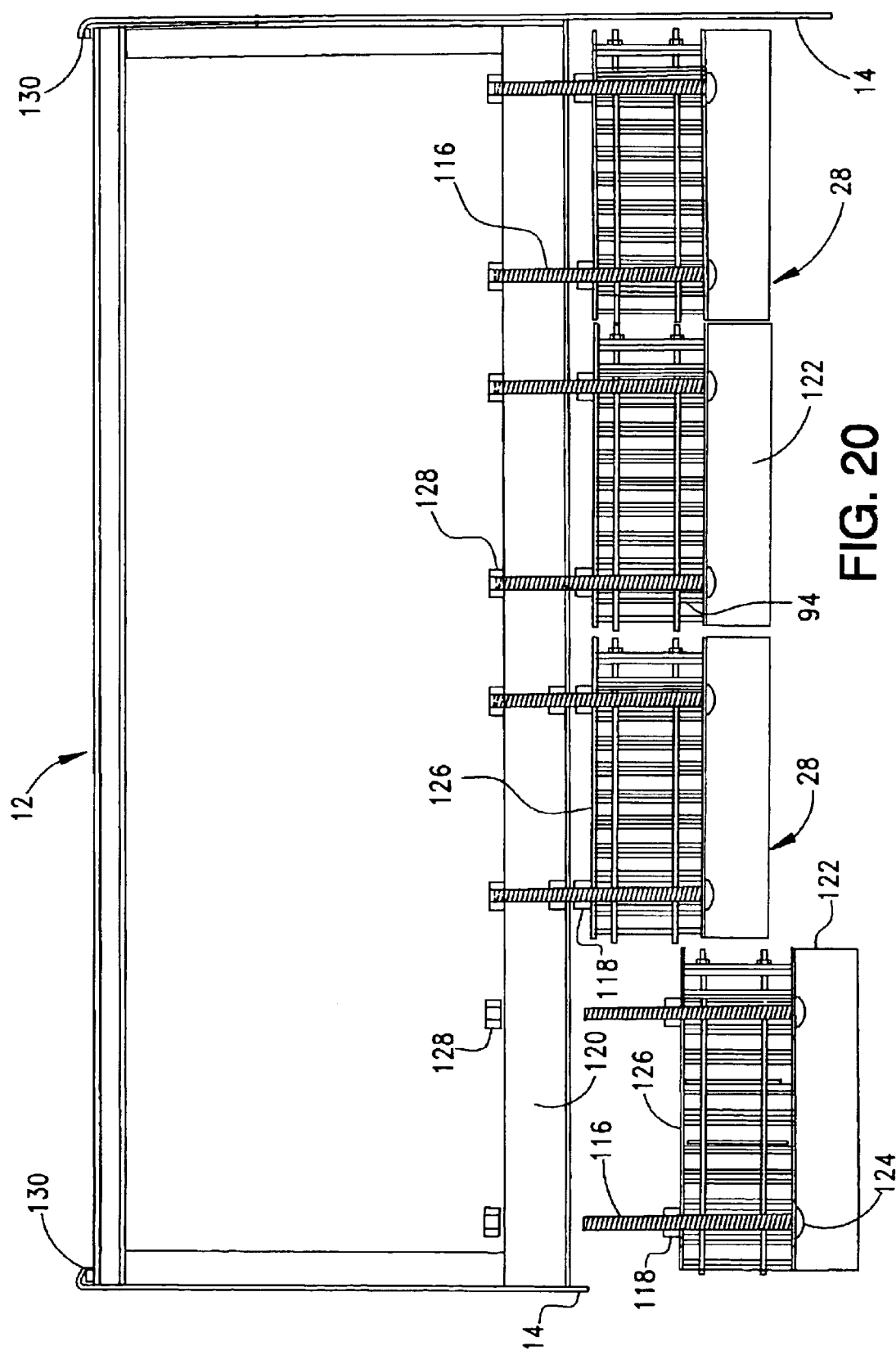
FIG. 20 is a simplified vertical section of an upper part of the apparatus of FIG. 1 modified and showing the suspension of the upper ends of four grates, the left most one in partially exploded view.

FIG. 20 shows in greater detail the mounting of the upper ends of the grates 28 to the hood 12 at the top of each cell. Round-headed suspension bolts 116, extending upwardly between adjacent pairs 94 of hanger bars, are locked in place by clamping nuts 118, and then pass upwardly through a cross beam 120 attached to the hood structure 12. Individual lengths of angle bars 122 are disposed under the upper pairs 94 of clamping bars between the round bolt heads 124 and the lower edges of the clamping bars. Individual lengths of flat stock 126 are disposed between the upper edges of the clamping bars and the clamping nuts 118. By adjusting tensioning nuts 128 of the suspension bolts 116, the elevation of the grates 28, and also the tension of the biomedia strands, can be adjusted. The leftmost grate is shown just before mounting to the hood. Another way of mounting the upper end of the curtain 14 on the hood is shown. The curtain 14 extends the full height of the hood 12, with the upper edge 130 of the curtain being hooked-shaped and hooked over the top of the hood. This hooked upper curtain edge 130 slidingly engages a rail running around the top of the hood. As will be appreciated, the hood 12 forms an airtight cover over the top of the trickle tower, which in this embodiment has four grates enclosed in the curtain 14 in the layout of FIG. 2.

The construction of the grates and the manner of readily adjusting the tension of the biomedia strands, reduces the risk of the strands swaying towards each other in use, so mitigating biomass bridging between strands. This risk is even further reduced by the feature of enabling the lower anchoring and tensioning bolts to be downwardly slideable.

The sealing of the curtain at the top and bottom of the cells enables the air or other gas content in the cells to be more accurately controlled, thereby improving operating conditions.

It will be appreciated, that not only does the curtain arrangement enable flexibility and economy in designing and building wastewater trickle towers, but the biomedia grate approach adds further flexibility and economy. These new grates, together with this new use of one or more flexible curtains, facilitate a unique modular approach to building trickle towers; but in turn, this produces various cross-sectional shapes for wastewater distribution, and this is addressed by the following aspects of the present invention.

FIGS. 21 to 29 illustrate wastewater distribution systems particularly designed for improved wastewater distribution to biomedia occupying variously shaped horizontal cross-sections.

Figure 21:
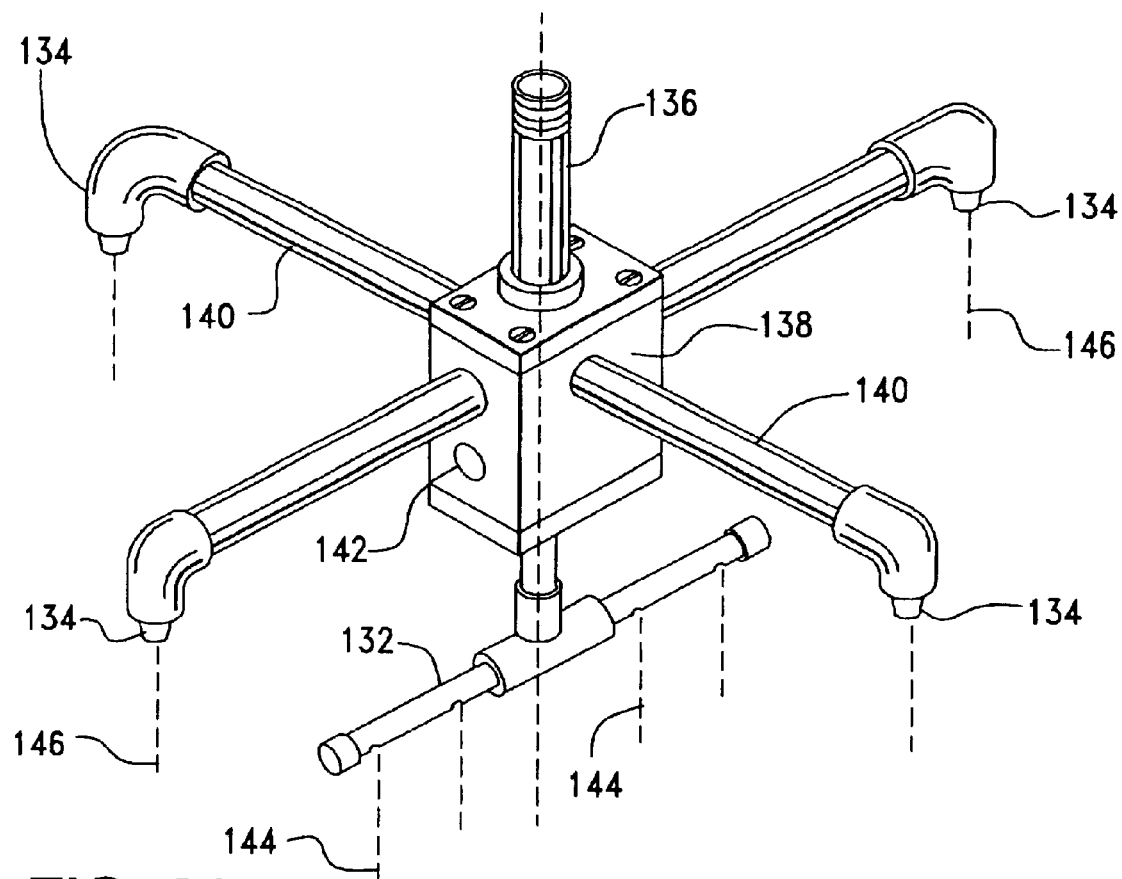
FIG. 21 is a diagrammatic perspective view of a wastewater spraying or discharge arrangement according to an aspect of the invention.

FIG. 21 illustrates such a system having a rotatable spray arm 132 and four symmetrically disposed stationary spray nozzles 134. The spray arm 132 is mounted on, and in communication with, the lower end of a rotatable wastewater supply pipe 136, and rotates with this pipe about the vertical axis thereof. The pipe 136 passes through a supply and pulsing unit 138 from which four pipes 140 extend horizontally to the four stationary nozzles 134. Wastewater is supplied to the unit 138 through an inlet port 142, and effects a continuous spray of wastewater 144 from a plurality of nozzle openings along the underside of the rotatable arm 132. From this wastewater supply, the unit 138 also provides pulses of wastewater to each of the stationary nozzles 134, which in turn provide downward intermittent jets or sprays of wastewater 146 onto the biomedia below.

Figure 22:
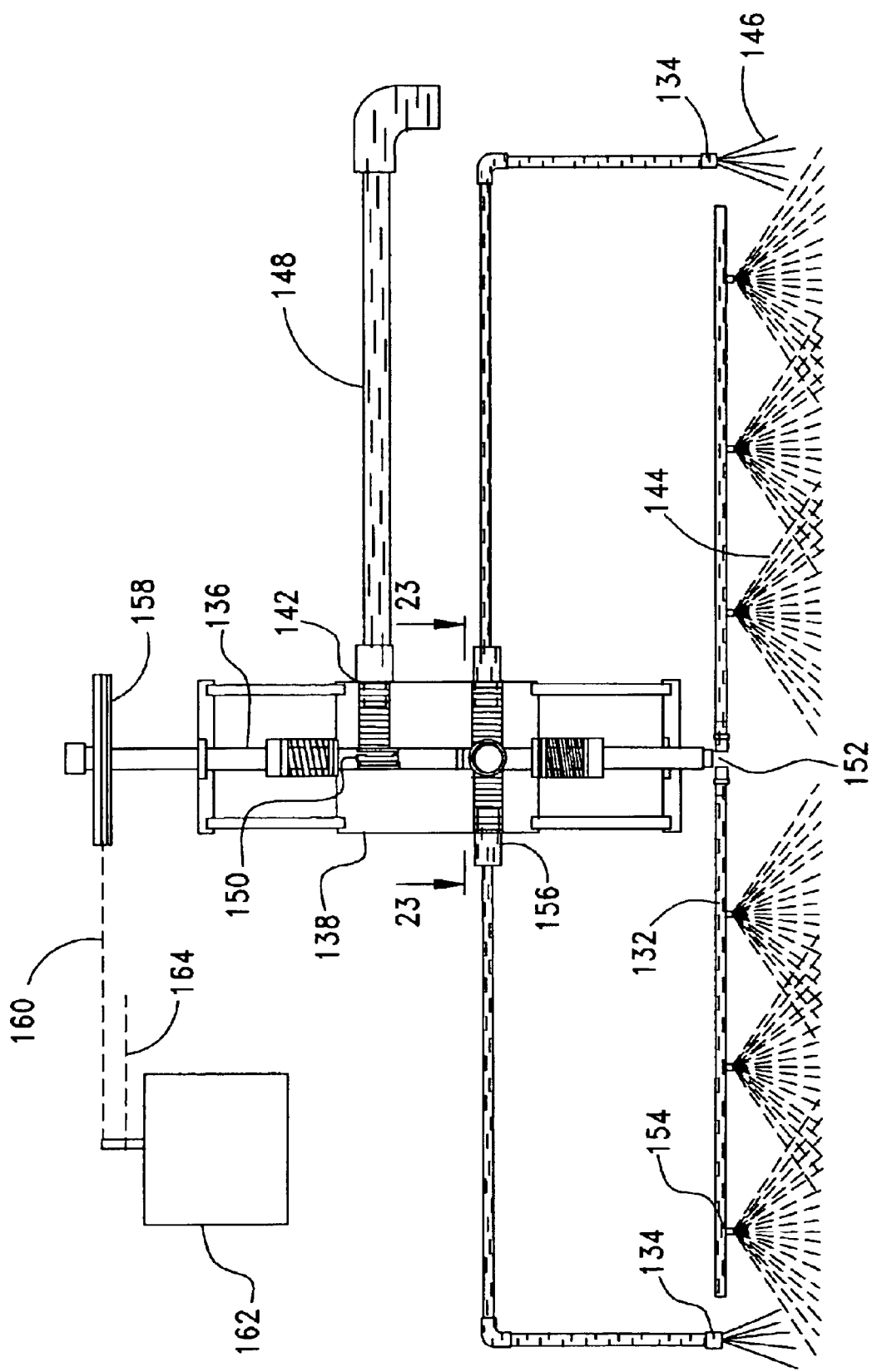
FIG. 22 is a simplified elevational view of an arrangement similar to that in FIG. 21.

FIG. 22 shows a wastewater feed pipe 148 connected to the inlet port 142 in the body of the unit 138 and communicating with an inlet in the rotating pipe 136. This inlet is formed by a series of vertical slots 150 all around the wall of the rotating pipe, so providing continuous communication between the pipes 148 and 136. The rotating pipe 136 communicates at its lower end, via a T-junction 152, with the center of the rotating arm 132. This rotating arm is schematically shown as having three nozzle orifices 154 on each side of the rotational axis, providing six jets of spray 144; the total number of nozzle orifices could be two, four, six, eight, or more (or any odd number), depending on the size of the trickle tower cell and the character of the wastewater being treated. Between the inlet pipe 148 and the spray arm 132, the rotating pipe 136 has a circular outlet orifice that sequentially communicates with four pulse nozzle outlets 156 (only three of which can be seen). These outlets supply the four stationary nozzles 134 (only two of which can be seen) with intermittent pulses of wastewater. The jets of spray 146, which are sequentially ejected downwardly from the stationary nozzles 134, impinge upon an area of the biomedia below that is either not covered, or not fully covered, by the sprays 144 issuing from the rotating spray arm 132. At the upper end of the shaft is mounted a pulley 158 connected, by a belt or chain 160, to a drive motor 162 mounted on the hood or a beam of the support structure. Schematically shown at 164 is another drive from the motor 162 for simultaneously driving a second, or more, similar wastewater discharge units. This spray arrangement can be used for each of the spraying systems 20 shown in FIGS. 1 and 10. The five systems 20 in FIG. 10 could be connected together by belts, or chains, or similar transmission, and driven by the single motor 162.

Figure 23:
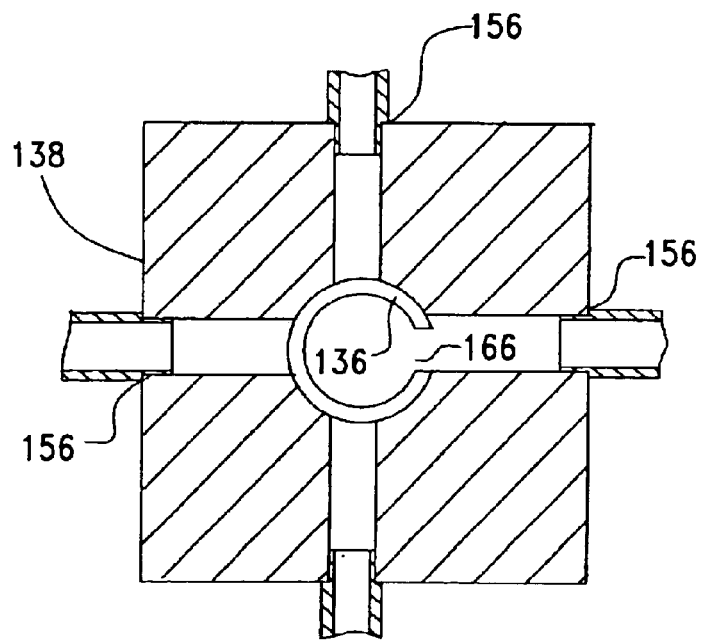
FIG. 23 is a section on the line 23—23 of FIG. 22.

FIG. 23 is a horizontal section through the unit 138 on the line 23—23 of FIG. 22, and shows the rotating pipe 136 with its circular outlet orifice 166 communicating with the right hand pulse outlet 156. As the pipe 136 rotates, the outlet orifice 166 communicates in turn with each of the pulse outlets 156. The pipe 136 rotates in a bore through a central block of the unit 138, so sealing the pulse outlets 156 from each other, and only permitting the rotating outlet orifice 166 to be in communication with one pulse outlet 156 at a time.

Figure 24:
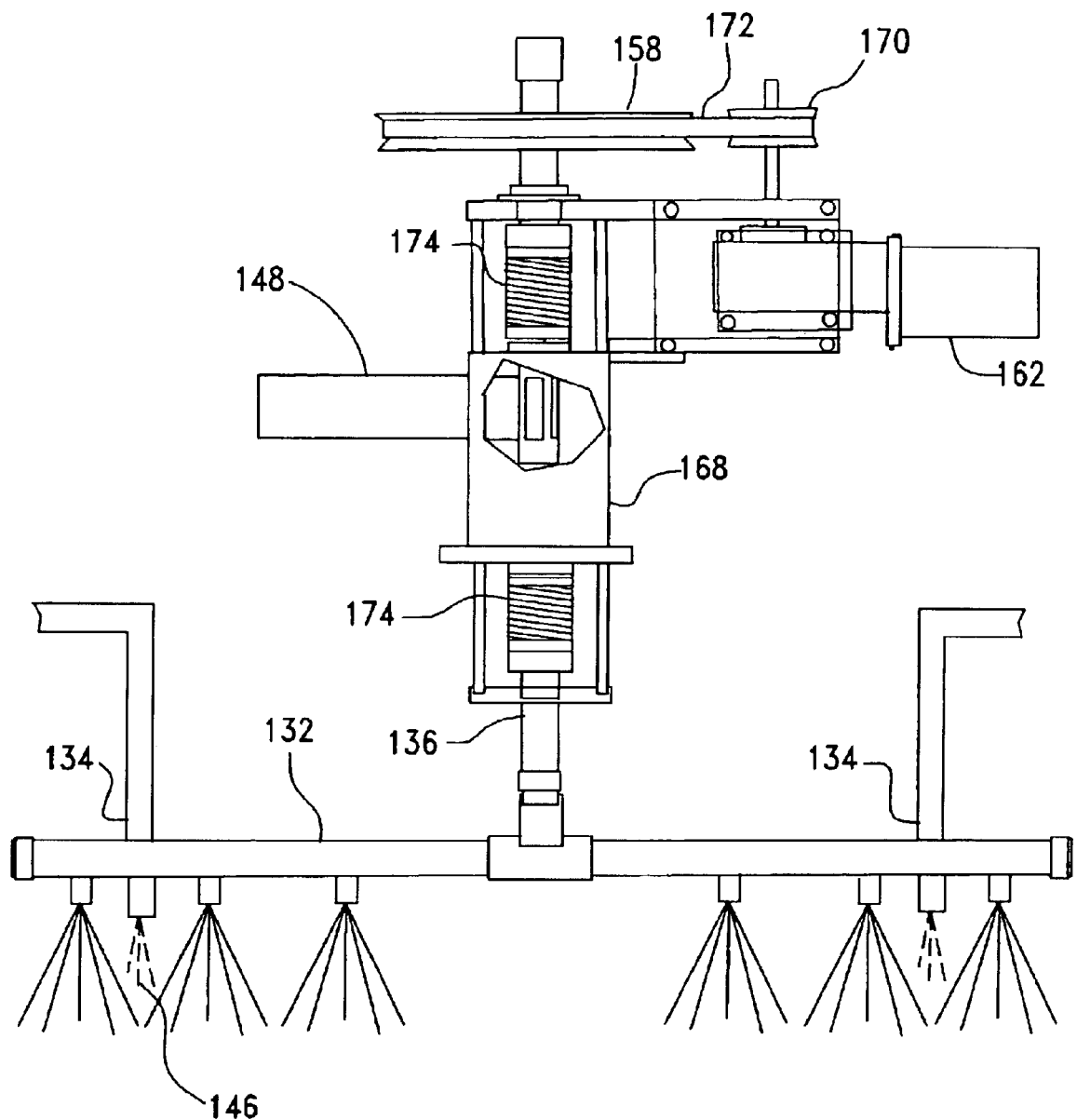
FIG. 24 is a diagrammatic elevational view of another wastewater spraying or discharge arrangement according to the invention.

FIG. 24 illustrates another embodiment in which the spray-arm drive 162 is mounted on a supply unit 168 through which the rotatable pipe 136 is journalled, with the spray arm 132 mounted, as before, on the bottom of the rotatable pipe. The motor drives the pipe 136 via pulleys 158, 170 and a belt 172. The inlet pipe 148 communicates with the rotating pipe 136 in the same way as described for FIG. 22. Below and above the unit 168, the pipe has flexible, watertight couplings 174. Behind the spray arm 132, are dispose two stationary pulse jet nozzles 134. These stationary nozzles 134 are connected to wastewater injectors, independent of the supply unit 168, and mounted at a convenient location in or adjacent the wastewater treatment cell. These injectors are supplied from the same stream of wastewater supplied to the pipe 148 for the supply unit 168. Instead of the injectors, pumps, valve arrangements, or any other means of creating intermittent jets may be used. Also, in all of the above pulsing arrangements, instead of the pulse jets 146 issuing in a progressive sequence, they may issue in any suitable sequence or, if particular circumstances required it, they could all issue as pulses at the same time.

Figure 25:
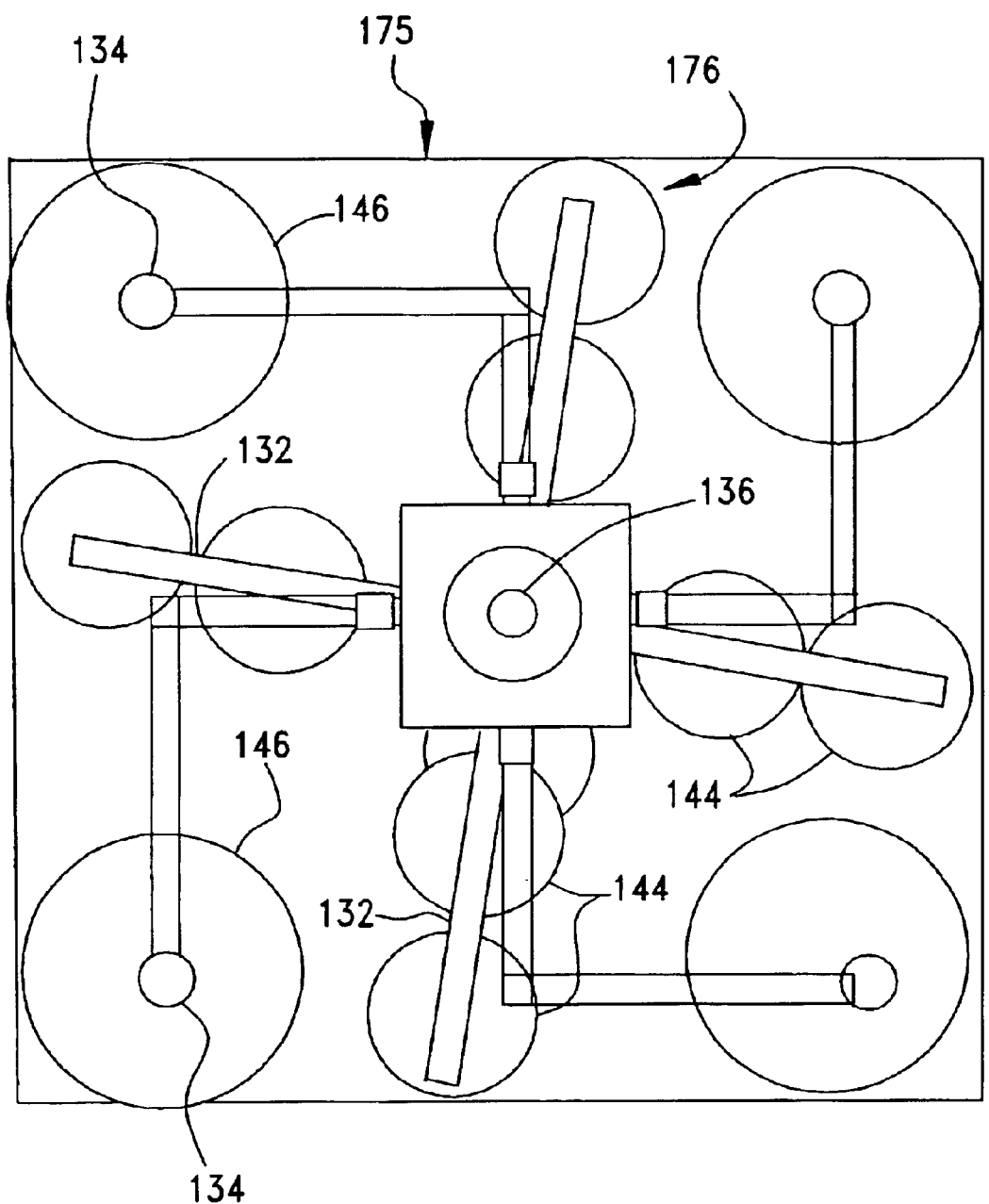
FIG. 25 is a plan view of another arrangement, similar to that of FIG. 21 or FIG. 22, according to the invention.

FIG. 25 is a plan view illustrating the spray pattern of the embodiments of FIGS. 21, 22, and 24. In this illustration, the previous single arm spray device, is replaced by a rotating spray device 176 comprising a pair of spray arms 132 at right angles to each other, both simultaneously and continuously in communication with the central rotating pipe 136. Each arm half is diagramatically shown as issuing two sprays 144 as in FIG. 21. The sprays 144 from the rotating arm(s) 132 issue continuously as they move continuously along circular paths. The stationary nozzles 134 are positioned over the four corners of the rectangular cell 175, and periodically and sequentially issue jets 146 into the cell corners. Each of the arm halves make a complete revolution while each stationary nozzle ejects only one pulse spray 146; this is because, in this illustration, the circularly moving jets 144 cover to some extent at least a portion of the corner areas. In addition, it will be noticed that the corner pulse jets 146 are shown as covering a larger area than the circularly moving jets 144. Different patterns of spray coverage may be designed, depending on the size and shape of the treatment cell, the speed of rotation of the moving sprays, the size of the sprays, etc.

A self-propelled rotating spray arm, as disclosed in U.S. Pat. No. 6,241,889, could be used in the above embodiments; but employing a drive motor, or motors, enables more control over the speed and uniformity of rotation of the rotating arm(s) 132, and thus more control over the bioprocess.

FIG. 26 is another embodiment of a wastewater discharge and distribution device, and shows an elevational view of an oscillating manifold 178 for intermittently spraying or cascading a sheet of wastewater downwardly onto and over the biomedia. This manifold comprises an outer casing 180 rotatably mounted in bearings 182 at each end, with a central perforated pipe 184 extending axially through the outer casing 180. A slot nozzle 186 radially extends outwardly from one side of the outer casing 180, and a flexible coupling 188 connects one end of the central pipe 184 to a wastewater supply pipe 190. The other end of the central pipe 184 is closed; the annular space 192 between the central pipe and the outer casing is close at both ends. The slot nozzle 186 is bounded on each side by sheet-like walls, the space between these walls communicating radially inwardly with the hollow interior of the manifold 178, and being open radially outwardly. The perforations 194 in the central pipe are located through an upper surface thereof diametrically opposite the radial slot nozzle 186. As can be seen, these perforations 194 are closer together at the inlet end of the central pipe 184, and increase in spacing apart towards the closed end (the left end in FIG. 26). This provides a greater area for wastewater passage into the annular space 192 of the manifold as the wastewater initially moves into the manifold, and restricts this area as the wastewater flows towards the closed end (to the left in FIG. 26). This provides a more uniform filling of the manifold annular space 192 than if the perforations are equally spaced apart, or if the central pipe had an open end discharging into the manifold. This decrease in transfer area, as the wastewater flows along the central pipe 184, can also be achieved by decreasing the size of the perforations 194, progressively or stepwise in groups, between the inlet end and the closed end of the central pipe; or by using a combination of perforation pitch and size variation.

The bearings 182 are supported in the hood of the cell being supplied with wastewater by this oscillating manifold 178, e.g. by the hood 12 in FIG. 20, or the supporting structure of the hood. The wastewater supply pipe 190 is the common supply pipe to a cell, such as the pipe 72 in FIG. 10.

FIG. 27 shows seven consecutive positions A through G of the manifold 178 as it moves through half an oscillation cycle. Diagramatically shown in each position, is the manifold with its outer casing 180, inner perforated pipe 184, and the slot nozzle 186. The wastewater level 196 in the manifold is shown, as is the top portion of the biomedia 18 being cascaded or sprayed by the oscillating manifold. In position A, the nozzle 186 is dwelling just above the horizontal position, and the manifold has filled with wastewater. As the nozzle passes through positions B, C, and D, wastewater pours out of the slot nozzle as a continuous sheet 198, with the wastewater level 196 in the manifold dropping because the rate of wastewater being discharged is greater than the rate of flow of wastewater into the manifold. The nozzle 186 passes through the vertical down position at position D, and then proceeds to climb to just above the horizontal position in position G. As can be seen, the water level 196 in the manifold continues to drop from position D through position G. The manifold dwells momentarily at position G, giving the manifold the opportunity to completely refill (with no water flowing out of the slot nozzle), before commencing the return half oscillation cycle from G through A, this return half cycle being the mirror image of the half cycle A through G. The manifold 178 oscillates through an angle of about 185 degrees; and, as can be seen, the biomedia 18 receives wastewater progressively over its entire width, first in one direction and then in the opposite direction. In this way, each portion of the biomedia is expose alternately to wastewater and air. The dwell at the end of each half cycle of oscillation, which may be nearly instantaneous or prolonged, advantageously increases the time the biomedia is exposed to air in the trickle tower. As can be seen in FIG. 27, the radially extending walls 200 of the slot nozzle 186 are parallel to each other, and extend for a distance at least equal to, and preferably greater than, the diameter of the manifold. However, the walls could diverge radially outwardly to enable the slot nozzle to be self-clearing.

FIG. 28 shows in plan view, and FIG. 29 in elevation, four manifolds 178 ganged together for simultaneous oscillation by a common drive motor 202. The motor rotates a crank arm 204, which reciprocates a connecting rod 206, which in turn reciprocates a horizontally moving bar 208. Each manifold has a radial arm 210 pivotally connected to the bar 208 for oscillation thereby. In this way, as the motor 202 rotates, the four manifolds oscillate in unison with their four slot nozzles remaining parallel. These four manifolds 178 could be mounted inside the hood 12 in FIG. 20, with one manifold over each grate 28, the biomedia of each grate receiving its own reciprocating sheet of wastewater. The inlet pipes of these four manifolds would be connected to a common wastewater supply pipe, for example, such as the pipe 72 in FIG. 10.

With the transmission arrangement shown in FIGS. 28 and 29, the manifold arms 210 oscillate through about 90 degrees, i.e. 45 degrees on each side of the vertical. This will function to discharge a sheet of wastewater back and forth across the biomedia, but the dwell period at each end of the stroke would essentially be eliminated. To obtain the better cycling arrangement of FIG. 27, a step-up transmission may be disposed in a housing 202 at one end of the manifold 178 (one such housing being illustrated in FIG. 29). This step-up transmission converts the 90 degree oscillation angle of the radial arm 210 into a 180 degree, or more, angle of oscillation of the connected manifold 178. In another embodiment, the ganged manifolds 178 are connected by one or more timing belts or chains, which are drivingly connected to a stepper motor. This stepper motor is controlled to oscillate through 180 degrees, or more, and is programmed for the length of dwell, when the motor is stopped, at the end of each half oscillation cycle.

Each manifold requires a wastewater supply with only a low pressure, because the wastewater only has to flow into the manifold, and does not require the pressure needed to create an effective jet spray. Consequently, when the wastewater has to be pumped up to the manifold, it requires a smaller pump motor than when the wastewater is pumped up to a spray arm, as in FIG. 22. This results in a motor cost saving, particularly with tall trickle towers.

Should a single manifold arrangement as in FIG. 26, or a ganged manifold arrangement as in FIG. 28, not cover or be adequate for the cross-sectional shape of a particularly shaped block of biomedia, then one or more pulse spray nozzles as in FIG. 24 could be included. For example, the five discharge devices 20 in FIG. 10 could be replaced by the single oscillating manifold 178 of FIGS. 26 and 27, and the stationary spray nozzles 134 of FIG. 24 disposed adjacent each end of the manifold 178, i.e. at each end of the cell 14 in FIG. 10.

As will be appreciated, the above wastewater discharge arrangements enable a good intermittent distribution of wastewater to biomedia in a trickle tower regardless of the cross-sectional shape occupied by the biomedia. In addition, improved control over the rate and uniformity of the wastewater distribution is made possible.

As also will be appreciated, not only does the curtain arrangement of the present invention enable flexibility and economy in designing and building wastewater trickle towers, but the sealing of the curtain at the top and bottom of the cells enables the air or other gas content in the cells to be more accurately controlled, thereby improving operating conditions for wastewater treatment. The sealing of the curtain at the top and bottom of the cells may be effected in various ways, e.g. by clamping, by adhesive, by sealing tape, etc.

The above described embodiments, of course, are not to be construed as limiting the breadth of the present invention. Modifications, and other alternative constructions, will be apparent which are within the spirit and scope of the invention as defined in the appended claims.

What is claimed is:

1. A wastewater treatment apparatus, comprising:

a support structure containing biomedia;

a spray arrangement supported by said support structure above said biomedia for spraying wastewater onto said biomedia;

said spray arrangement comprising a rotatable device having at least one nozzle opening movable along a circular path as said device rotates, and at least one stationary nozzle located outwardly of said circular path;

supply means for supplying wastewater to said rotatable device; and pulse means for supplying pulses of wastewater to said stationary nozzle.

2. The apparatus claimed in claim 1, wherein said biomedia occupies a block-like space that has a rectangular cross-section.

3. The apparatus claimed in claim 1, wherein said supply means comprises a rotatable pipe in communication with said device, and said pulse means comprises an opening in a side wall of said pipe communicating intermittently with a pathway connected to said stationary nozzle.

4. The apparatus claimed in claim 3, wherein there is a plurality of stationary nozzles, and said opening communicates sequentially with said nozzles as said pipe rotates.

5. The apparatus claimed in claim 3, wherein said supply means further comprises a pump connected to said pipe for supplying a flow of wastewater for said nozzle opening, this flow passing both by and through said opening in the side wall of said pipe.

6. The apparatus claimed in claim 1, wherein said biomedia is surrounded by a flexible curtain suspended from said support structure.

7. The apparatus claimed in claim 1, wherein said biomedia comprises stands of looped cord.

8. An apparatus for treating wastewater, comprising:

a trickle tower containing strands of looped cord biomedia;

spray means for spraying wastewater onto said biomedia;

said spray means comprising at least one rotatable device having at least one nozzle opening movable along a circular path as the device rotates, and at least one stationary nozzle; and pulse means for intermittently supplying pulses of wastewater to said stationary nozzle.

9. The trickle tower of claim 8, further comprising means for adjustably tensioning said strands.

* * * * *